US008070871B2

(12) United States Patent
Kawabe et al.

(10) Patent No.: US 8,070,871 B2
(45) Date of Patent: Dec. 6, 2011

(54) INK JET INK, INK JET RECORDING METHOD, INK CARTRIDGE, RECORDING UNIT, AND INK JET RECORDING APPARATUS

(75) Inventors: Minako Kawabe, Koganei (JP); Hiroshi Tomioka, Tokyo (JP); Kumiko Mafune, Kawasaki (JP); Hideki Yamakami, Kawasaki (JP); Satomi Yanagimachi, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 12/388,129

(22) Filed: Feb. 18, 2009

(65) Prior Publication Data

US 2009/0238974 A1    Sep. 24, 2009

(30) Foreign Application Priority Data

Mar. 19, 2008    (JP) .................. 2008-072275

(51) Int. Cl.
*C09D 11/02* (2006.01)
*B41J 2/01* (2006.01)
(52) U.S. Cl. .................. 106/31.58; 106/31.86; 347/100
(58) Field of Classification Search .............. 106/31.58, 106/31.86; 347/100; 427/256
See application file for complete search history.

(56) References Cited

U.S. PATENT DOCUMENTS

| 4,723,129 A | 2/1988 | Endo et al. ............... 346/1.1 |
| 4,740,796 A | 4/1988 | Endo et al. ............... 346/1.1 |
| 5,078,790 A | 1/1992 | Tochihara et al. .......... 106/20 |
| 5,080,716 A | 1/1992 | Aoki et al. ............... 106/20 |
| 5,131,949 A | 7/1992 | Tochihara et al. .......... 106/20 |
| 5,132,700 A | 7/1992 | Tochihara et al. .......... 346/1.1 |
| 5,213,613 A | 5/1993 | Nagashima et al. .......... 106/20 |
| 5,258,066 A | 11/1993 | Kobayashi et al. ........... 106/22 |
| 5,296,022 A | 3/1994 | Kobayashi et al. .......... 106/20 |
| 5,451,251 A | 9/1995 | Mafune et al. ............. 106/22 |
| 5,466,282 A | 11/1995 | Eida et al. ................. 106/22 |
| 5,571,313 A | 11/1996 | Mafune et al. ............. 106/22 |
| 5,936,649 A | 8/1999 | Ikeda et al. ................ 347/87 |
| 6,412,936 B1 | 7/2002 | Mafune et al. ............ 347/100 |
| 6,460,988 B1 | 10/2002 | Mafune et al. ............ 347/100 |
| 6,702,882 B2 | 3/2004 | Yakushigawa et al. .... 106/31.27 |
| 6,706,100 B2 | 3/2004 | Mafune et al. ........... 106/31.27 |
| 6,706,104 B2 | 3/2004 | Takuhara et al. .......... 106/31.6 |
| 6,843,839 B2 | 1/2005 | Kanke et al. ............. 106/31.47 |
| 6,866,380 B2 | 3/2005 | Yakushigawa et al. ...... 347/100 |

(Continued)

FOREIGN PATENT DOCUMENTS

JP    3-255171    11/1991

(Continued)

*Primary Examiner* — Helene Klemanski
(74) *Attorney, Agent, or Firm* — Fitzpatrick, Cella, Harper & Scinto

(57) ABSTRACT

An ink jet ink is provided which can retain good stability and shows superior intermittent ejection stability not only under a low-temperature, low-humidity environment but also a high-temperature, low-humidity environment even when the evaporation of water in the ink progresses. The ink jet ink includes a coloring material and water-soluble organic solvents, wherein the content of the coloring material is less than 7.0 mass %, the water-soluble organic solvents include glycerin and a branched alkanediol having hydroxyl groups at both terminals of its main chain, the content C of glycerin is 6.0 to 12.0 mass %, the content A of the branched alkanediol is 4.0 to 11.0 mass %, and the content A of the branched alkanediol and the total content B of the water-soluble organic solvents satisfy the relationship of $0.30 \leq A/B \leq 0.50$.

10 Claims, 9 Drawing Sheets

U.S. PATENT DOCUMENTS

| | | | |
|---|---|---|---|
| 6,966,944 B2 | 11/2005 | Shimomura et al. | 106/31.43 |
| 7,144,452 B2 | 12/2006 | Takayama et al. | 106/31.52 |
| 7,195,664 B2 | 3/2007 | Mafune et al. | 106/31.27 |
| 7,198,664 B2 | 4/2007 | Mafune et al. | 106/31.28 |
| 7,198,665 B2 | 4/2007 | Nakamura et al. | 106/31.52 |
| 7,208,033 B2 | 4/2007 | Kawabe et al. | 106/31.48 |
| 7,244,299 B2 | 7/2007 | Tsuji et al. | 106/31.48 |
| 7,247,196 B2 | 7/2007 | Sato et al. | 106/31.52 |
| 7,297,194 B2 | 11/2007 | Shinjo et al. | 106/31.27 |
| 7,364,770 B2 | 4/2008 | Nagashima et al. | 427/215 |
| 7,374,606 B2 | 5/2008 | Sato et al. | 106/31.27 |
| 7,445,666 B2 | 11/2008 | Yanagimachi et al. | 106/31.47 |
| 7,520,927 B2* | 4/2009 | Yamakami et al. | 106/31.58 |
| 7,550,037 B2 | 6/2009 | Mafune et al. | 106/31.48 |
| 2006/0176349 A1* | 8/2006 | Nagai et al. | 106/31.86 |
| 2006/0194056 A1 | 8/2006 | Nagashima et al. | 428/403 |
| 2006/0194897 A1 | 8/2006 | Kawabe et al. | 523/160 |
| 2006/0266260 A1* | 11/2006 | Yatake | 106/31.58 |
| 2007/0109378 A1 | 5/2007 | Yamakami et al. | 347/100 |
| 2007/0148376 A1 | 6/2007 | Tomioka et al. | 428/32.1 |
| 2007/0159516 A1* | 7/2007 | Sato et al. | 106/31.58 |
| 2008/0018722 A1* | 1/2008 | Mafune et al. | 347/100 |
| 2008/0136862 A1 | 6/2008 | Kawabe et al. | 347/29 |
| 2008/0151028 A1 | 6/2008 | Yamakami et al. | 347/100 |
| 2008/0274284 A1 | 11/2008 | Fujimoto et al. | 427/256 |
| 2008/0280042 A1 | 11/2008 | Yanagimachi et al. | 427/256 |
| 2008/0280043 A1 | 11/2008 | Moribe et al. | 427/256 |
| 2008/0292793 A1* | 11/2008 | Yamashita et al. | 427/256 |
| 2009/0238975 A1* | 9/2009 | Yamakami et al. | 427/256 |
| 2009/0238976 A1* | 9/2009 | Ishii et al. | 427/256 |
| 2009/0238977 A1* | 9/2009 | Kawabe et al. | 427/256 |

FOREIGN PATENT DOCUMENTS

| | | |
|---|---|---|
| JP | 5-70726 | 3/1993 |
| JP | 2000-297237 | 10/2000 |
| JP | 2005-298813 | 10/2005 |
| JP | 2007-39680 | 2/2007 |

* cited by examiner

INK JET INK, INK JET RECORDING METHOD, INK CARTRIDGE, RECORDING UNIT, AND INK JET RECORDING APPARATUS

BACKGROUND OF THE INVENTION

1. Field of the Invention

The present invention relates to an ink jet ink, an ink jet recording method, an ink cartridge, a recording unit, and an ink jet recording apparatus.

2. Description of the Related Art

In a state that ink is not ejected for a certain time period from an ejection orifice of a recording head in a process of scanning with the recording head when images are formed by employing an ink jet recording method, water or the like in ink evaporates from the ejection orifice of a recording head, so the ejection of the ink may not be normally performed. That is, sufficient intermittent ejection stability can not be obtained in some cases.

For example, such ink as described below has been proposed for solving the above-mentioned problem. For example, Japanese Patent Application Laid-Open No. H03-255171 proposes an ink containing an alkylene glycol having 7 or more carbon atoms. In addition, Japanese Patent Application Laid-Open No. 2000-297237 proposes an ink containing an ethylene glycol-based organic solvent. In addition, Japanese Patent Application Laid-Open No. H05-070726 proposes an ink containing a dicarboxylic acid monoester. In addition, Japanese Patent Application Laid-Open No. 2005-298813 proposes an ink containing water-soluble organic compounds different from each other in water retentivity at predetermined temperature and predetermined humidity as an ink capable of suppressing curling of a recorded article and of providing ejection stability. Further, Japanese Patent Application Laid-Open No. 2007-039680 proposes an ink containing water, a coloring material, 1,5-pentanediol, and a water retention agent, and an ink having such properties as to change from a gel or solid to a liquid depending on temperature and humidity environments as inks capable of providing ejection stability.

SUMMARY OF THE INVENTION

The inventors of the present invention have examined such conventional inks as described above for the degree of its intermittent ejection stability. As a result, the inventors have found the following: those inks are aimed at improving intermittent ejection stability under a low-temperature, low-humidity environment which has been conventionally perceived as a problem, and thus, no problem arises in terms of the intermittent ejection stability of each of those inks even when being applied to an ink jet recording apparatus having an ejection volume of about 10 pL under, for example, a low-temperature, low-humidity environment, a normal-temperature, normal-humidity environment, or a normal-temperature, low-humidity environment. To be specific, the inventors have found that no problem arises in terms of the intermittent ejection stability of each of those inks under a normal-temperature, normal-humidity environment having, for example, a temperature of 25° C. and a relative humidity of 50 to 60%, a normal-temperature, low-humidity environment having, for example, a temperature of 25° C. and a relative humidity of 10 to 20%, or a low-temperature, low-humidity environment having, for example, a temperature of 15° C. and a relative humidity of 10 to 20%. It should be noted that the problem of the intermittent ejection stability resulting from the evaporation of water or the like hardly arises under a high-humidity (for example, relative humidity of 80 to 90%) irrespective of the temperature.

However, an investigation conducted by the inventors of the present invention has showed that each of those inks shows insufficient intermittent ejection stability under a high-temperature, low-humidity environment (having, for example, a temperature of 30° C. and a relative humidity of 10%) where water is more liable to evaporate than under, for example, a low-temperature, low-humidity environment, so the intermittent ejection stability under the high-temperature, low-humidity environment is susceptible to improvement. The investigation has shown that the reduction in intermittent ejection stability is remarkable particularly when a small ink droplet having an ejection volume of 5 pL or less, especially 2 pL or less is ejected, or when each of the inks is ejected from an ejection orifice having an extremely small diameter, specifically, less than 10 μm.

On the other hand, the ink described in Japanese Patent Application Laid-Open No. 2007-039680 intended for an improvement in intermittent ejection stability under a high-temperature, low-humidity environment shows insufficient stability under a low-temperature, low-humidity environment, so the temperature of the ink must be kept at a certain temperature or higher before the ink is ejected. In view of the foregoing, the inventors have found that the ink requires more energy, and the above characteristic is not enough for the ink to adapt to various environments.

In association with recent widespread use of an ink jet recording method, the expansion of environments in which an ink jet recording apparatus is used, a reduction in size of a recording head, and an increase in recording speed have progressed, so improvements in stability and intermittent ejection stability of ink under various environments such as a low-temperature, low-humidity environment and a high-temperature, low-humidity environment have come to be required.

Therefore, an object of the present invention is to provide an ink jet ink having the following characteristics: a coloring material hardly precipitates or solidifies even when the ink is left standing for a long time period, that is, the ink shows good stability, and the ink is excellent in intermittent ejection stability not only under a low-temperature, low-humidity environment but also under a high-temperature, low-humidity environment. Another object of the present invention is to provide an ink jet recording method, an ink cartridge, a recording unit, and an ink jet recording apparatus each using the ink jet ink.

The above-mentioned objects can be achieved by the present invention below. That is, an ink jet ink according to the present invention includes at least a coloring material and water-soluble organic solvents, in which a content of the coloring material is less than 7.0 mass % based on a total mass of the ink, the water-soluble organic solvents include at least glycerin and a branched alkanediol having hydroxyl groups at both terminals of its main chain, a content C of glycerin is 6.0 mass % or more and 12.0 mass % or less based on the total mass of the ink, a content A of the branched alkanediol having hydroxyl groups at both terminals of its main chain is 4.0 mass % or more and 11.0 mass % or less based on the total mass of the ink, and the content A of the branched alkanediol having hydroxyl groups at both terminals of its main chain and a total content B of the water-soluble organic solvents based on the total mass of the ink satisfy a relationship of $0.30 \leq A/B \leq 0.50$.

An ink jet recording method according to another aspect of the present invention includes ejecting ink by an ink jet method to perform recording on a recording medium, in which the ink is the ink jet ink having the above constitution.

An ink cartridge according to another aspect of the present invention includes an ink storage portion for storing ink, in which the ink is the ink jet ink having the above constitution.

A recording unit according to another aspect of the present invention includes an ink storage portion for storing ink and a recording head for ejecting the ink, in which the ink is the ink jet ink having the above constitution.

An ink jet recording apparatus according to another aspect of the present invention includes an ink storage portion for storing ink and a recording head for ejecting the ink, in which the ink is the ink jet ink having the above constitution.

According to the present invention, there can be provided an ink jet ink having the following characteristics: even when the evaporation of water in the ink progresses, the ink can retain good stability, and, furthermore, the ink shows excellent intermittent ejection stability under various environments such as a low-temperature, low-humidity environment and a high-temperature, low-humidity environment. According to another aspect of the present invention, there can be provided an ink jet recording method, an ink cartridge, a recording unit, and an ink jet recording apparatus each using the ink jet ink.

Further features of the present invention will become apparent from the following description of exemplary embodiments with reference to the attached drawings.

DESCRIPTION OF THE EMBODIMENTS

Figure 1:
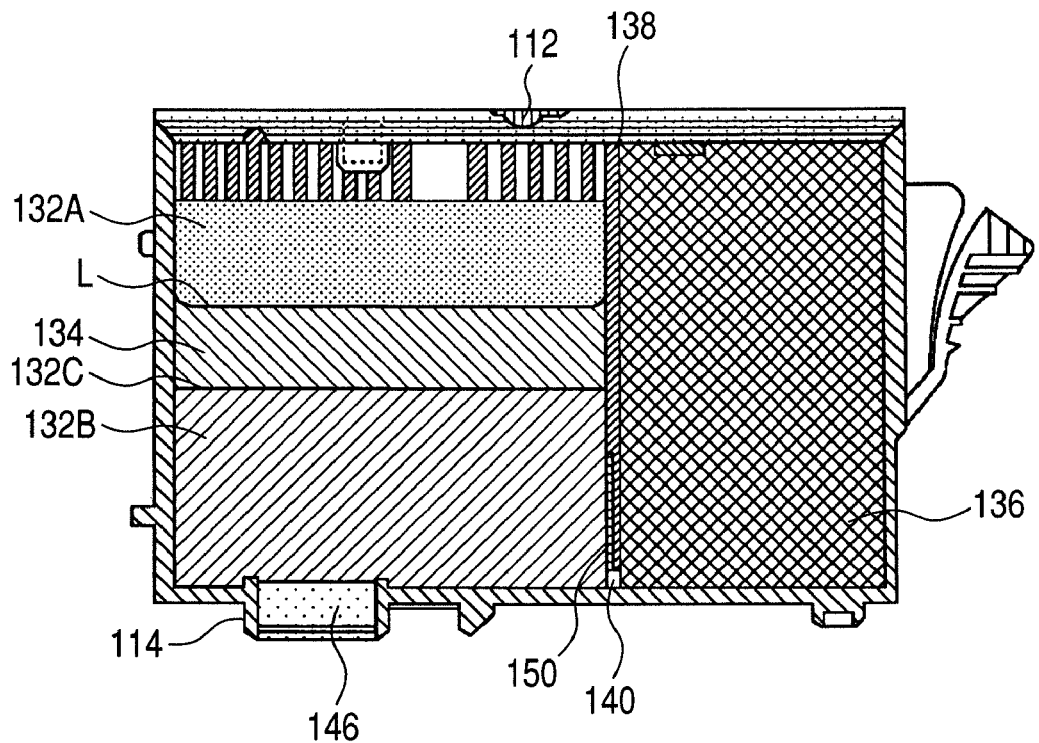
FIG. 1 is an outline explanatory view of an ink cartridge.

Hereinafter, the present invention is described more specifically by way of a preferred embodiment. It should be noted that, in the present invention, a water-soluble organic solvent even if which is a solid at normal temperature (20 to 25° C.) is included in the category of "water-soluble organic solvents" when a component such as a coloring material can be dissolved or dispersed in an aqueous solution prepared by dissolving the water-soluble organic solvent in water.

The inventors of the present invention have made investigations into kinds and contents of water-soluble organic solvents to be mainly used in an ink jet ink (hereinafter also referred to simply as "ink") in order to solve the above-mentioned problems in the prior art. More specifically, the inventors have conducted the investigations while paying particular attention to an ink containing an alkanediol-based water-soluble organic solvent among the water-soluble organic solvents. As a result, the inventors have found that intermittent ejection stability is improved specifically under both a low-temperature, low-humidity environment and a high-temperature, low-humidity environment when using a branched alkanediol having hydroxyl groups at both terminals of its main chain among the alkanediol-based water-soluble organic solvents. In view of the foregoing, the inventors of the present invention consider that the above-mentioned excellent effect results from the fact that a molecule of the above branched alkanediol incorporated into the ink has a structure which has hydroxyl groups at both terminals of its main chain and is branched.

However, a further investigation conducted by the inventors of the present invention has shown that when only the above-mentioned branched alkanediol having hydroxyl groups at both terminals of its main chain is incorporated as a water-soluble organic solvent into the ink, there are some cases where the ink is unable to obtain sufficient stability. In addition, the cause thereof is considered as follows: since the branched alkanediol having hydroxyl groups at both terminals of its main chain is a poor solvent for the coloring material, the precipitation or solidification of the coloring material is additionally promoted in association with the evaporation of water in the ink. It should be noted that the term "poor solvent" refers to a water-soluble organic solvent in which the coloring material shows low solubility when the coloring material is a dye, or a water-soluble organic solvent which, when the coloring material is a pigment, destabilizes the dispersed state of the pigment.

In view of the foregoing, the inventors of the present invention have made investigations into various inks each containing a combination of the branched alkanediol having hydroxyl groups at both terminals of its main chain and any other water-soluble organic solvent except the branched alkanediol for the purpose of obtaining an ink excellent not only in intermittent ejection stability but also in stability. As a result, the inventors have found that, depending on kinds and contents of water-soluble organic solvents to be combined, the stability of the ink is improved as compared with that in the case where only the branched alkanediol having hydroxyl groups at both terminals of its main chain is incorporated, and such unexpected effects as described below can be obtained. That is, the inventors have found that the following excellent synergistic effect can be obtained: intermittent ejection stability under the environments described above, in particular, the high-temperature, low-humidity environment, is additionally improved. Further, the inventors have found that an ink having better intermittent ejection stability than an ink containing only the branched alkanediol or only a water-soluble organic solvent except the branched alkanediol can be obtained.

The inventors of the present invention consider that the reason why an ink in which the branched alkanediol having hydroxyl groups at both terminals of its main chain and a specific water-soluble organic solvent are contained in combination has better intermittent ejection stability than the above-mentioned other ink is as described below. First, one cause of a reduction in intermittent ejection stability of ink consists in the evaporation of water in the ink from an ejection orifice even while a time period, a very short time period, where the ink is not ejected in a process of scanning of a recording head. In other words, water evaporates so that the solubility or dispersion stability of a coloring material may relatively be lowered. In addition, the coloring material is precipitated or solidified to clog the ejection orifice, with the result that the intermittent ejection stability is reduced. More specifically, the concentration of the coloring material in the ink relatively increases in the vicinity of the ejection orifice in association with the evaporation of water in the ink from the ejection orifice, with the result that a difference in coloring material concentration arises between the vicinity of the ejection orifice and the inside of a nozzle distant from the ejection orifice. At this time point, the solubility or dispersion stability of the coloring material is reduced in the vicinity of the ejection orifice, so the coloring material is precipitated or solidified to clog the ejection orifice. As a result, intermittent ejecting performance deteriorates. The thickening of the ink in association with the evaporation of moisture in the ink is another cause of the reduction in intermittent ejection stability.

Since the ink of the present invention contains the branched alkanediol having hydroxyl groups at both terminals of its main chain and a specific water-soluble organic solvent, the following phenomenon occurs: upon evaporation of water in the ink from an ejection orifice, the diffusion of a coloring material resulting from a difference in coloring material concentration between the vicinity of the ejection orifice and the inside of a nozzle occurs more quickly than a reduction in solubility or dispersion stability of the coloring material does, whereby the precipitation or solidification of the coloring material in the vicinity of the ejection orifice can be suppressed. The diffusion of the coloring material occurs through the following mechanism. In association with the evaporation of water, the concentration of each of the coloring material, the branched alkanediol having hydroxyl groups at both terminals of its main chain, and the specific water-soluble organic solvent in the vicinity of the ejection orifice increases than before the evaporation. In this case, the alkanediol having hydroxyl groups at both terminals of its main chain serves as a poor solvent for the coloring material, so the coloring material diffuses quickly toward the inside of the nozzle distant from the ejection orifice to maintain its solubility. Thus, in the vicinity of the ejection orifice, the concentration of the coloring material is prevented from increasing to such an extent that the coloring material precipitates or solidifies, whereby excellent intermittent ejection stability can be obtained.

It should be noted that, in the invention described in Japanese Patent Application Laid-Open No. 2005-298813 cited above, the ink is caused to contain a specific amount of a predetermined water-soluble organic solvent, so the evaporation of water from an ejection orifice and an increase in viscosity of the ink in a nozzle are suppressed, thereby obtaining ejection stability. In addition, in the invention described in Japanese Patent Application Laid-Open No. 2007-039680, attempts have been made to eject the ink in a good state by designing the characteristics of the ink so that the ink may easily gel or solidify at ordinary temperature, and may liquefy at the temperature at which the ink is ejected.

As described above, the improvement of intermittent ejection stability in the prior art is based on the idea that the evaporation of water is suppressed with a water retention agent, thereby inhibiting a coloring material from precipitating or solidifying or the idea that the characteristics of ink are changed depending on temperature. However, the use of the prior art can achieve only intermittent ejection stability under an extremely limited environment, for example, only a low-temperature, low-humidity environment or only a high-temperature, low-humidity environment, and cannot provide intermittent ejection stability under various environments as requested in recent years.

In contrast, the present invention is based on the following idea completely different from the idea on which the prior art is based: the branched alkanediol having hydroxyl groups at both terminals of its main chain, the branched alkanediol serving as a poor solvent for the coloring material, and the specific water-soluble organic solvent are used in combination, whereby the coloring material is effectively diffused in a nozzle, and both the stability and ejection stability of the ink are improved.

The inventors of the present invention have conducted a further investigation in addition to the above-mentioned investigations, and have concentrated their attention on deriving optimum conditions for kinds and contents of water-soluble organic solvents to be used in the ink. As a result, the inventors have found that an ink satisfying stability and intermittent ejection stability under various environments such as a low-temperature, low-humidity environment and a high-temperature, low-humidity environment to an additionally large extent is provided when the following requirements are satisfied:

(1) first, the content A (mass %) of the branched alkanediol having hydroxyl groups at both terminals of its main chain in the ink is 4.0 mass % or more and 11.0 mass % or less with reference to the total mass of the ink;

(2) in addition, glycerin is used as a water-soluble organic solvent together with the branched alkanediol having hydroxyl groups at both terminals of its main chain, and the content C (mass %) of glycerin in the ink is 6.0 mass % or more and 12.0 mass % or less based on the total mass of the ink;

(3) further, the content A (mass %) of the branched alkanediol having hydroxyl groups at both terminals of its main chain and the total content B (mass %) of water-soluble organic solvents with reference to the total mass of the ink satisfy the relationship of $0.30 \leq A/B \leq 0.50$; and (4) the content (mass %) of the coloring material in the ink is less than 7.0 mass % based on the total mass of the ink.

Although it is not clear why the ink having the above constitution is excellent in stability and in intermittent ejection stability not only under a low-temperature, low-humidity environment but also under a high-temperature, low-humidity environment, the inventors of the present invention consider the reasons as described below.

The reason why the requirement (1) should be satisfied is considered as follows: as described above, when the branched alkanediol having hydroxyl groups at both terminals of its main chain to be used as a water-soluble organic solvent in the ink has a branched structure having hydroxyl groups at both terminals, and its content is 4.0 mass % or more, excellent intermittent ejection stability can be obtained; meanwhile, when the content of the branched alkanediol having hydroxyl groups at both terminals of its main chain, the branched alkanediol serving as a poor solvent for the coloring material, is set to be 11.0 mass % or less, excellent intermittent ejection stability can be obtained while the stability of the ink is inhibited from being lowered.

The reason why the requirement (2) should be satisfied is considered as described below. First, glycerin serves as a good solvent for the coloring material. Accordingly, when glycerin is used in combination with the branched alkanediol having hydroxyl groups at both terminals of its main chain with the content of glycerin in the ink set within the above-mentioned range, the coloring material diffuses efficiently even in the case where an ink jet recording apparatus is left standing in a state of ejecting no ink from an ejection orifice for a certain time period. As a result, the intermittent ejection stability under a high-temperature, low-humidity environment can be additionally improved. It should be noted that, when the content of glycerin is less than 6.0 mass %, the effect exhibited by incorporating glycerin as a good solvent becomes insufficient in some cases. In addition, when the content of glycerin is more than 12.0 mass %, a synergistic effect exhibited by using in combination the branched alkanediol having hydroxyl groups at both terminals of its main chain and glycerin is not sufficiently obtained in some cases. A ratio of the content A (mass %) of the branched alkanediol having hydroxyl groups at both terminals of its main chain to the content C (mass %) of glycerin particularly preferably satisfies the relationship of $0.40 \leqq A/C \leqq 2.5$ in order to more effectively obtain the synergistic effect.

The reason why the requirement (3) should be satisfied is considered as described below. That is, when a ratio (A/B) of the content A of the branched alkanediol having hydroxyl groups at both terminals of its main chain to the total content B of the water-soluble organic solvents in the ink is set within the above-mentioned range, the compatibility between the acquisition of the synergistic effect on the intermittent ejection stability and the acquisition of the ink stability can be achieved. When the ratio A/B is less than 0.30, an effect exerted by the use of the branched alkanediol having hydroxyl groups at both terminals of its main chain is impaired by any other water-soluble organic solvent, and the effect of improving the intermittent ejection stability is not sufficiently obtained in some cases. In addition, when the ratio A/B is more than 0.50, the branched alkanediol having hydroxyl groups at both terminals of its main chain is a poor solvent for the coloring material, and a ratio of the poor solvent to the water-soluble organic solvents increases, and the ink stability is not sufficiently obtained in some cases.

The reason why the requirement (4) should be satisfied is considered as described below. That is, as the content of the coloring material in the ink increases, the evaporation of water in the ink from an ejection orifice progresses in the case where an ink jet recording apparatus is left standing in a state of ejecting no ink from the ejection orifice for a certain time period, and the precipitation or solidification of the coloring material is apt to occur. In addition, when the content of the coloring material in the ink is 7.0 mass % or more based on the total mass of the ink, an excellent effect on the intermittent ejection stability exhibited by using the branched alkanediol having hydroxyl groups at both terminals of its main chain and glycerin is not sufficiently obtained in some cases.

<Ink>

Components constituting the ink according to the present invention, the physical properties of the ink, etc. are described below in detail.

(Branched Alkanediol Having Hydroxyl Groups at Both Terminals of its Main Chain)

As described above, the ink of the present invention must contain the branched alkanediol having hydroxyl groups at both terminals of its main chain at a specific content. For example, any one of the following compounds can be specifically used as the branched alkanediol having hydroxyl groups at both terminals of its main chain. Such branched alkanediols each having hydroxyl groups at both terminals of the main chain as cited below may be used each singly or in combination.

2-methyl-1,3-propanediol, 2-ethyl-1,3-propanediol, 2,2-dimethyl-1,3-propanediol, 2,2-diethyl -1,3-propanediol, 2-methyl-2-propyl-1,3-propanediol, and the like. 2-methyl-1,5-pentanediol, 3-methyl-1,5-pentanediol, 2,2-dimethyl-1,5-pentanediol, 2,4-dimethyl -1,5-pentanediol, 2,4-diethyl-1,5-pentanediol, and the like. 2,5-diethyl-1,6-hexanediol, 2,2,4-trimethyl-1,6-hexanediol, and the like. 2,4,6-trimethyl-1,7-heptanediol and the like. 2-methyl-1,8-octanediol, 2,6-dimethyl-1,8-octanediol, and the like.

In addition, according to an investigation conducted by the inventors of the present invention, it is found that the total number of carbon atoms in the branched alkanediol having hydroxyl groups at both terminals of its main chain is preferably 5 or more and 9 or less. When the total number of carbon atoms falls within such range, an ink having the following characteristic can be obtained: the ink has superior intermittent ejection stability under a high-temperature, low-humidity environment or stability. In particular, when the total number of carbon atoms in the branched alkanediol having hydroxyl groups at both terminals of its main chain exceeds 9, the intermittent ejection stability may deteriorate owing to, for example, a reduction in solubility of the branched alkanediol in an aqueous medium. In the foregoing, the number of carbon atoms in the branched alkanediol having hydroxyl groups at both terminals of its main chain means the number of all the carbon atoms in the compound including main chain and branches. In addition, branches (substituents) in the branched alkanediol having hydroxyl groups at both terminals of its main chain are preferably attached so as to be symmetric with respect to the main chain. For example, when the number of carbon atoms of the main chain is an odd number, the carbon atom at the center of the main chain is preferably branched (or substituted). Examples of such branched alkanediol include the following: 2-methyl-1,3-propanediol, 2-ethyl-1,3-propanediol, 2,2-dimethyl-1,3-propanediol, 2,2-diethyl -1,3-propanediol, 2-methyl-2-propyl-1, 3-propanediol, and 3-methyl-1,5-pentanediol. Further, the number of carbon atoms of a branched portion (substituent portion) in the branched alkanediol is preferably less than the number of carbon atoms of the main chain. Further, a branch (substituent) in the branched alkanediol is preferably a methyl group or an ethyl group, or particularly preferably a methyl group. A particularly preferable example of a branched alkanediol having hydroxyl groups at both terminals of its main chain, which satisfies such a condition and can be used in the present invention, is 3-methyl-1,5-pentanediol. Even when a small ink droplet having an ejection volume of 5 pL or less, especially 2 pL or less, is ejected, excellent intermittent ejection stability and excellent ink stability can be obtained under various environments by using the compound.

(Aqueous Medium: Other Water-Soluble Organic Solvents, Water)

As described above, in the ink of the present invention, each of the branched alkanediol having hydroxyl groups at both terminals of its main chain and glycerin must be used as a water-soluble organic solvent in a specific content, and the content A of the branched alkanediol having hydroxyl groups at both terminals of its main chain and the total content B of the water-soluble organic solvents are required to be set in a specific ratio. In addition, in the ink of the present invention, water and water-soluble organic solvents used in general ink jet ink may be used as an aqueous medium in addition to the branched alkanediol and glycerin inasmuch as such conditions are satisfied. Deionized water (ion-exchange water) is preferably used as water. A water content (mass %) in the ink is preferably 50.0 mass % or more and 95.0 mass % or less based on the total mass of the ink.

Conventionally known water-soluble organic solvents except the branched alkanediol having hydroxyl groups at both terminals of its main chain and glycerin may be used without any particular limitation as long as they are used for ink jet ink. To be specific, for example, the following water-soluble organic solvents may be used each singly or in combination:

alkyl alcohols each having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols each having a weight average molecular weight of about 200 to 1,000 such as polyethylene glycol and polypropylene glycol; glycols such as ethylene glycol, diethylene glycol, propylene glycol, butylene glycol, triethylene glycol, hexylene glycol, and thiodiglycol; alkylene glycols in each of which an alkylene group has 2 to 6 carbon atoms such as 1,2,6-hexane triol; alkyl ether acetates such as polyethylene glycol monomethyl ether acetate; alkyl ethers of polyhydric alcohols such as ethylene glycol monomethyl (or ethyl)ether, diethylene glycol methyl (or ethyl)ether, and triethylene glycol monomethyl (or ethyl)ether; polyhydric alcohols such as trimethylolpropane and trimethylolethane; N-methyl-2-pyrrolidone, 2-pyrrolidone, urea, sugars, and derivatives thereof. In the present invention, ethylene glycol, diethylene glycol, a polyethylene glycol having a weight average molecular weight of around 200, urea, or 2-pyrrolidone out of those solvents is particularly preferably used.

The total content B (mass %) of all the water-soluble organic solvents in the ink is preferably 3.0 mass % or more and 50.0 mass % or less, or more preferably 14.0 mass % or more and 35.0 mass % or less, based on the total mass of the ink. When the content is set within the range, an ink can be obtained having superior intermittent ejection stability under, in particular, a low-temperature, low-humidity environment and superior stability.

(Coloring Material)

A dye such as an acid dye or a direct dye, a pigment, etc. may be used as the coloring material for the ink of the present invention. Two or more kinds of them may be used in combination. As described above, in the present invention, the content of the coloring material in the ink must be less than 7.0 mass % based on the total mass of the ink. Further, the content of the coloring material in the ink is preferably 0.1 mass % or more and less than 7.0 mass % based on the total mass of the ink. When the content is less than 0.1 mass %, a sufficient image density is not obtained in some cases. In addition, when the content is 7.0 mass % or more, as described above, the effect of the present invention, i.e., the effect of improving the intermittent ejection stability exhibited by using a specific amount of a specific water-soluble organic solvent is not sufficiently obtained in some cases.

[Dye]

A dye that can be used in the ink of the present invention is not particularly limited, but it is preferable that an anionic dye is used, and a dye having a suitable color tone and suitable density can be used regardless of whether the dye is an existing one or a newly synthesized one. Hereinafter, examples of the dye that can be used in the present invention are described for each color tone.

<Dye for Cyan Ink>

C.I. Direct Blue: 1, 15, 22, 25, 41, 76, 77, 80, 86, 90, 98, 106, 108, 120, 158, 163, 168, 199, 226, 307, and the like; and C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, and the like.

<Dye for Magenta Ink>

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and the like; C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and the like; C.I. Food Red: 87, 92, 94, and the like; and C.I. Direct Violet 107 and the like.

<Dye for Yellow Ink>

C.I. Direct Yellow: 8, 11, 12, 27, 28, 33, 39, 44, 50, 58, 85, 86, 87, 88, 89, 98, 100, 110, 132, and the like; C.I. Acid Yellow: 1, 3, 7, 11, 17, 23, 25, 29, 36, 38, 40, 42, 44, 76, 98, 99, and the like; C.I. Reactive Yellow: 2, 3, 17, 25, 37, 4, and the like; and C.I. Food Yellow: 3 and the like.

<Dye for Red Ink>

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and the like; C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and the like; C.I. Reactive Red: 7, 12, 13, 15, 17, 20, 23, 24, 31, 42, 45, 46, 59, and the like; and C.I. Food Red: 87, 92, 94, and the like <Dye for Blue Ink>

C.I. Direct Blue: 1, 15, 22, 25, 41, 76, 77, 80, 86, 90, 98, 106, 108, 120, 158, 163, 168, 199, 226, and the like; C.I. Acid Blue: 1, 7, 9, 15, 22, 23, 25, 29, 40, 43, 59, 62, 74, 78, 80, 90, 100, 102, 104, 117, 127, 138, 158, 161, and the like; and C.I. Reactive Blue: 4, 5, 7, 13, 14, 15, 18, 19, 21, 26, 27, 29, 32, 38, 40, 44, 100, and the like.

<Dye for Black Ink>

C.I. Direct Black: 17, 19, 22, 31, 32, 51, 62, 71, 74, 112, 113, 154, 168, 195, and the like; C.I. Acid Black: 2, 48, 51, 52, 110, 115, 156, and the like; and C.I. Food Black: 1, 2, and the like.

[Pigment]

Examples of the pigment that can be used in the ink of the present invention include carbon blacks and organic pigments described below.

<Carbon Black>

Carbon black is preferred as a pigment to be used in a black ink. Examples of carbon black to be used include commercially available products of furnace black, lamp black, acetylene black, and channel black. Hereinafter, examples of the carbon black that can be used in the present invention are described.

Raven: 7000, 5750, 5250, 5000 ULTRA, 3500, 2000, 1500, 1250, 1200, 1190 ULTRA-II, 1170, and 1255 (manufactured by Columbia); Black Pearls L, Regal: 400R, 330R, 660R, Mogul L, Monarch: 700, 800, 880, 900, 1000, 1100, 1300, 1400, and Valcan XC-72R (all of which are manufactured by Cabot Corporation); Color Black: FW1, FW2, FW2V, FW18, FW200, S150, S160, S170, Printex: 35, U, V, 140U, 140V, Special Black: 6, 5, 4A, and 4 (all of which are manufactured by Degussa); and No. 25, No., 33, No. 40, No. 47, No. 52, No. 900, No. 2300, MCF-88, MA600, MA7, MA8, and MA100 (all of which are manufactured by Mitsubishi Chemical Corporation).

Carbon black newly prepared may also be used. Of course, the present invention is not limited thereto. Conventionally known carbon blacks other than the above-mentioned carbon blacks can also be used. Magnetic fine particles made of magnetite, ferrite or the like, titanium black, or the like may be used as the black pigment.

<Organic Pigments>

As the pigment in the color ink, various organic pigments are preferably used. Examples of the organic pigments that can be used in the present invention include the following:

Water-insoluble azo pigments such as toluidine red, toluidine maroon, Hansa yellow, benzidine yellow, and pyrazolone red; water-soluble azo pigments such as lithol red, helio bordeaux, pigment scarlet, and permanent red 2B; derivatives of vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; indigo-based pigments; condensed azo-based pigments; thioindigo-based pigments; diketopyrrolopyrrole-based pigments; flavanthrone yellow, acylamide yellow, quinophthalone yellow, nickel azo yellow, copper azo methine yellow, perinone orange, anthrone orange, dianthraquinonyl red, and dioxazine violet.

Further, examples of the organic pigment represented by a color index (C. I.) number that can be used in the present invention include the following: C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, and the like; C.I. Pigment Orange: 16, 36, 43, 51, 55, 59, 61, 71, and the like; C.I. Pigment Red: 9, 48, 49, 52, 53, 57, 97, 122, 123, 149, 168, 175, 176, 177, 180, 192, and the like; or C.I. Pigment Red: 215, 216, 217, 220, 223, 224, 226, 227, 228, 238, 240, 254, 255, 272, and the like; C.I. Pigment Violet 19, 23, 29, 30, 37, 40, 50, and the like; C.I. Pigment Blue 15, 15:1, 15:3, 15:4, 15:6, 22, 60, 64, and the like; C.I. Pigment Green 7, 36, and the like; and C.I. Pigment Brown 23, 25, 26, and the like.

[Dispersant]

When a pigment such as carbon black or an organic pigment is used as the coloring material, a surfactant, resin (polymer), or the like is preferably used as a dispersant in order to stably disperse the pigment in the aqueous medium. When a resin is used as a polymer dispersant, the resin has a weight average molecular weight of preferably 1,000 or more and 30,000 or less, or more preferably 3,000 or more and 15,000 or less. In addition, the resin has an acid value of preferably 30 mgKOH/g or more and 400 mgKOH/g or less, or more preferably 50 mgKOH/g or more and 250 mgKOH/g or less.

In the present invention, the dispersant is preferably, for example, as follows: the dispersant has an ionic group, and can stably disperse carbon black or organic pigment in the aqueous medium by virtue of the action of the ionic group. For example, any one of the following compounds can be used as such a dispersant:
a styrene-acrylic acid copolymer and a styrene-acrylic acid-alkyl acrylate copolymer; a styrene-maleic acid copolymer and a styrene-maleic acid-alkyl acrylate copolymer; a styrene-methacrylic acid copolymer and a styrene-methacrylic acid-alkyl acrylate copolymer; a styrene-maleic acid half ester copolymer; a vinylnaphthalene-acrylic acid copolymer and a vinylnaphthalene-maleic acid copolymer; a styrene-maleic anhydride-maleic acid half ester copolymer; and salts of these copolymers.

[Self-Dispersible Pigment]

In addition, when a pigment such as carbon black or an organic pigment is used as the coloring material, the so-called self-dispersible pigment having the following characteristic can also be used: an ionic group such as an anionic group is bonded to the surface of a pigment particle, whereby the pigment can be dispersed in the aqueous medium without using any dispersant.

(Other Additives)

Various additives below may be incorporated in the ink of the present invention, as required, in addition to the above-mentioned components, for the purpose of, for example, obtaining an ink having desirable physical property values. For example, the following may be incorporated: surfactants, pH adjusters, antifoaming agents, preservatives, antiseptics, antimicrobial agents, antioxidants, anti-reduction agents, evaporation accelerators, chelating agents, soluble polymers, etc.

When the surfactant is used as the additive, for example, an anionic or nonionic surfactant can be used. Specific examples of the anionic surfactant include salts of fatty acids, sulfates of higher alcohols, sulfates of liquid fatty oils, and alkyl aryl sulfonates. In addition, examples of the nonionic surfactant include polyoxyethylene alkyl ethers, polyoxyethylene alkyl esters, polyoxyethylene sorbitan alkyl esters, acetylene alcohol, and acetylene glycol. The surfactants may be used each singly or in combination. Of those, in the present invention, acetylene alcohols and acetylene glycols, which can provide an excellent effect on permeability into a recording medium such as plain paper, are particularly preferably used as surfactants. The content (mass %) of the surfactant in the ink depends on kinds of surfactants, and in general, is preferably 0.01 mass % or more and 5.0 mass % or less based on the total mass of the ink.

(Physical Properties of Ink)

The ink of the present invention has a surface tension of preferably 10 mN/m or more and 60 mN/m or less, or more preferably 20 mN/m or more and 60 mN/m or less at 25° C. Setting the surface tension of the ink of the present invention within the above-mentioned range can effectively suppress the occurrence of, for example, recording slippage (deviation of a point on which an ink droplet impinges) due to the wetting of the vicinity of an ejection orifice upon application of the ink to an ink jet method. The surface tension of the ink can be adjusted by appropriately determining the content of such a surfactant as described above in the ink. In addition, the viscosity or pH of the ink of the present invention is preferably adjusted to a desired value so that an ejection characteristic such as good clogging resistance may be obtained upon application of the ink to an ink jet recording apparatus.

<Recording Medium>

Each of, for example, plain paper and a recording medium having a coat layer or ink-receiving layer such as glossy paper, coated paper, or a glossy film can be used as a recording medium to be used upon formation of an image with the ink of the present invention as long as the recording medium is such that recording is performed by applying the ink. Of those, a recording medium having, for example, a hydrophilic porous particle layer or porous polymer layer on a base material is particularly preferably used in order that an image having, for example, superior definition, contrast, and transparency can be obtained. In addition, in the present invention, a type of ink jet recording medium is preferably used in which fine particles constituting the porous structure of an ink-receiving layer adsorb the coloring material such as a dye or pigment. A recording medium having on a support the so-called absorption type ink-receiving layer in which pores are formed for absorbing ink is particularly preferably used. The absorption type ink-receiving layer is mainly formed of fine particles, and furthermore, may contain a binder or other additives as required.

As the fine particle used in the recording medium, specifically, the following may be used: inorganic pigments such as silica, clay, talc, calcium carbonate, kaolin, aluminum oxide such as alumina or alumina hydrate, diatomaceous earth, titanium oxide, hydrotalcite, and zinc oxide; and organic pigments such as a urea formalin resin, an ethylene resin, and a styrene resin. One kind of fine particles may be used singly, or two or more kinds of fine particles may be used in combination.

As the binder used in the recording medium, water-soluble polymers, latex, etc. are exemplified. Specifically, the following may be used: polyvinyl alcohol, starch, gelatin, or modified products thereof; arabic rubber; cellulose derivatives such as carboxymethyl cellulose, hydroxyethyl cellulose, and hydroxypropyl methyl cellulose; vinyl-based copolymer latexes such as an SBR latex, an NBR latex, a methyl methacrylate-butadiene copolymer latex, functional group-modified polymer latexes, and an ethylene vinyl acetate copolymer; polyvinyl pyrrolidone; maleic anhydrides and a copolymer thereof; and an acrylate copolymer. These binders may be used each singly or in combination as needed.

Other additives used in the recording medium include dispersants, thickeners, pH adjusters, lubricants, flowability modifiers, surfactants, antifoaming agents, release agents, fluorescent whitening agents, UV absorbers, antioxidants, etc.

<Ink Jet Recording Method>

The ink of the present invention is particularly suitably used in an ink jet recording method including ejecting the ink by means of an ink jet method to record on a recording medium. Examples of the ink jet recording method include a recording method involving applying mechanical energy to ink to eject the ink and a recording method involving applying thermal energy to ink to eject the ink. Of those, the ink of the present invention is particularly preferably used in an ink jet recording method involving the use of thermal energy.

<Ink Cartridge>

An ink cartridge suitable for performing recording with the ink of the present invention is, for example, an ink cartridge including an ink storage portion for storing the ink.

FIG. 1 is an outline explanatory view illustrating an ink cartridge. In FIG. 1, the upper portion of the ink cartridge is in communication with the air through an air communication port 112, and the lower portion of the cartridge is in communication with an ink supply port. Then, the ink cartridge has such a structure that a negative pressure generating member storing chamber 134 for storing negative pressure generating members and a liquid storing chamber 136 substantially hermetically sealed for storing liquid ink are partitioned by a partition 138. The negative pressure generating member storing chamber 134 and the liquid storing chamber 136 are in communication with each other only through a communication hole 140 formed in the partition 138 near the bottom portion of the ink cartridge and an air introduction groove (air introduction path) 150 for promoting the introduction of the air into the liquid storing chamber at the time of liquid supplying operation. The upper wall of the ink cartridge constituting the negative pressure generating member storing chamber 134 has a plurality of ribs integrally molded so as to protrude toward the inside of the cartridge, and the ribs abut against a negative pressure generating member stored in a compressed state in the negative pressure generating member storing chamber 134. Air buffer chambers are formed by the ribs between the upper wall and the upper surface of the negative pressure generating member. In addition, an ink supply cylinder including a liquid supply port 114 is provided with a press contact body 146 having capillary force and physical strength higher than those of another negative pressure generating member, and the body is brought into press contact with the other negative pressure generating member.

The negative pressure generating member storing chamber 134 stores, as the negative pressure generating members, two capillary force generating type negative pressure generating members: a first negative pressure generating member 132B and a second negative pressure generating member 132A each formed of fibers of an olefin-based resin such as polyethylene. A portion of the intersection of the partition 138 and a boundary layer 132C between the two negative pressure generating members is present above the upper end portion of the air introduction groove (air introduction path) 150 in such a posture of the ink cartridge at the time of use that the communication portion is set downward. In addition, the ink stored in the negative pressure generating members extends to a portion above the boundary layer 132C as indicated by a liquid surface L of the ink.

Here, the first negative pressure generating member 132B and the second negative pressure generating member 132A are brought into press contact with each other at the boundary layer, and compressibility and capillary force in the vicinity of the boundary layer between the negative pressure generating members are higher than those at any other site. That is, capillary force P1 of the first negative pressure generating member 132B, capillary force P2 of the second negative pressure generating member 132A, and capillary force PS of the interface between the negative pressure generating members can be arranged as follows: P2<P1<PS.

Figure 2:
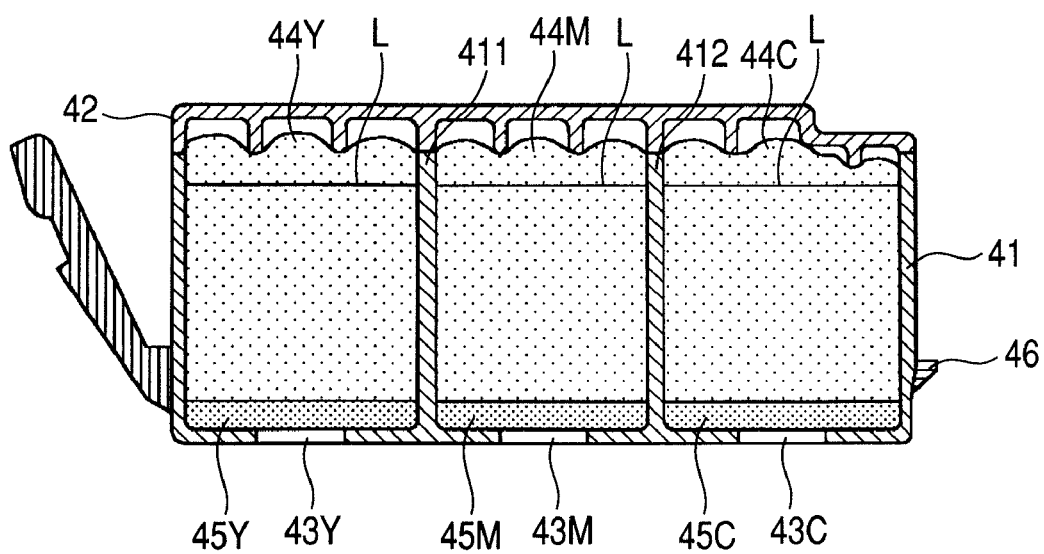
FIG. 2 is an outline explanatory view of an ink cartridge.

FIG. 2 is an outline explanatory view illustrating another embodiment of an ink cartridge. The ink cartridge having the form illustrated in FIG. 2 has a container 41 for storing three color inks, i.e., yellow (Y), magenta (M), and cyan (C); and a lid member 42 for covering the container 41. The ink cartridge has a supply port for each of the yellow, magenta and cyan inks, i.e., a yellow ink supply port 43Y, a magenta ink supply port 43M, and a cyan ink supply port 43C. The inside of the container 41 is partitioned by two partitions 411 and 412 placed in parallel with each other into three spaces having substantially equal volumes in order that the three color inks may be stored. Those three spaces are arranged along the direction in which the ink cartridge is inserted upon mounting the ink cartridge on an ink cartridge holder. Each of those spaces stores an ink absorber 44Y for absorbing and holding the yellow ink, an ink absorber 44M for absorbing and holding the magenta ink, and an ink absorber 44C for absorbing and holding the cyan ink. In addition, ink supplying members 45Y, 45M, and 45C for supplying the respective inks to the ink supply ports are each stored so as to be in contact with the lower portion of the corresponding ink absorber. The ink stored in each of the ink absorbers 44Y, 44M, and 44C, which are negative pressure generating members, extends to a portion above the ink absorber as indicated by the liquid surface L of the ink.

Figure 3:
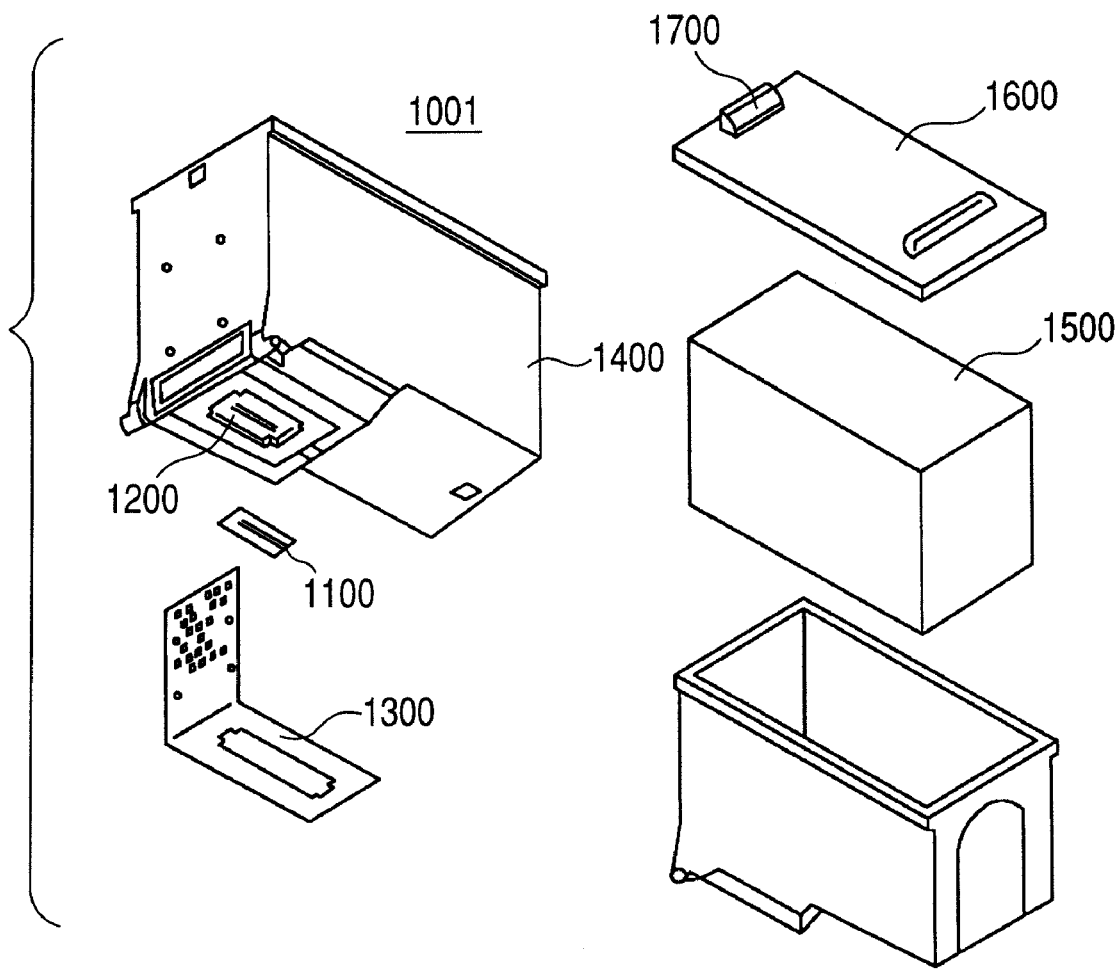
FIG. 3 is an exploded view of a recording head.

FIG. 3 is an exploded view of a recording head integrated with an ink cartridge. When the recording head is used, an ink cartridge can be preferably used in which a difference in the amount of each ink constituting an ink set evaporated from each liquid chamber is substantially equal. That "a difference in the amount of each ink constituting an ink set evaporated from each liquid chamber is substantially equal" means, for example, that when water is incorporated into each liquid chamber and an evaporation rate from each liquid chamber is measured, the difference in the evaporation rate between the liquid chambers is about 1% or less.

A recording head 1001 illustrated in FIG. 3 is supported and fixed by a unit for registering a carriage mounted on an ink jet recording apparatus and electrical contacts. In addition, the recording head 1001 is detachable from the carriage, and is exchanged as the ink held in the head is consumed.

The recording head 1001 is intended for the ejection of the ink, and has a recording element substrate 1100 in which ink supply orifices are formed in parallel, and an electric wiring tape 1300 forming an electrical signal path through which an electrical signal for ejecting the ink is applied. Further, the inside of the recording head is formed of an ink-supplying/holding member 1400 formed by molding a resin, an ink absorber 1500 for generating negative pressure for holding the ink, and a lid member 1600.

The ink-supplying/holding member 1400 is provided with a function as an ink cartridge and an ink-supplying function. That is, the member has a space for holding the absorber 1500 for generating a negative pressure for holding a cyan, magenta or yellow ink, thereby having a function as an ink cartridge. Further, the member has the ink-supplying function by forming an independent ink channel for introducing ink to each ink supply orifice of the recording element substrate 1100. Ink supply orifices 1200 for supplying ink to the recording element substrate 1100 are formed in the downstream portions of the ink channels. In addition, the recording element substrate 1100 is fixed to the ink-supplying/holding member 1400 so that the ink supply orifices of the recording element substrate 1100 can communicate with the ink supply orifices 1200 of the ink-supplying/holding member 1400. In addition, part of the back surface of the electric wiring tape 1300 is fixed to a plane around the ink supply orifices 1200. The lid member 1600 is welded to the upper opening portion of the ink-supplying/holding member 1400 to close the space in the ink-supplying/holding member 1400. The lid member 1600 has an engaging portion 1700 for fixing the recording head to the ink jet recording apparatus.

Figure 4:
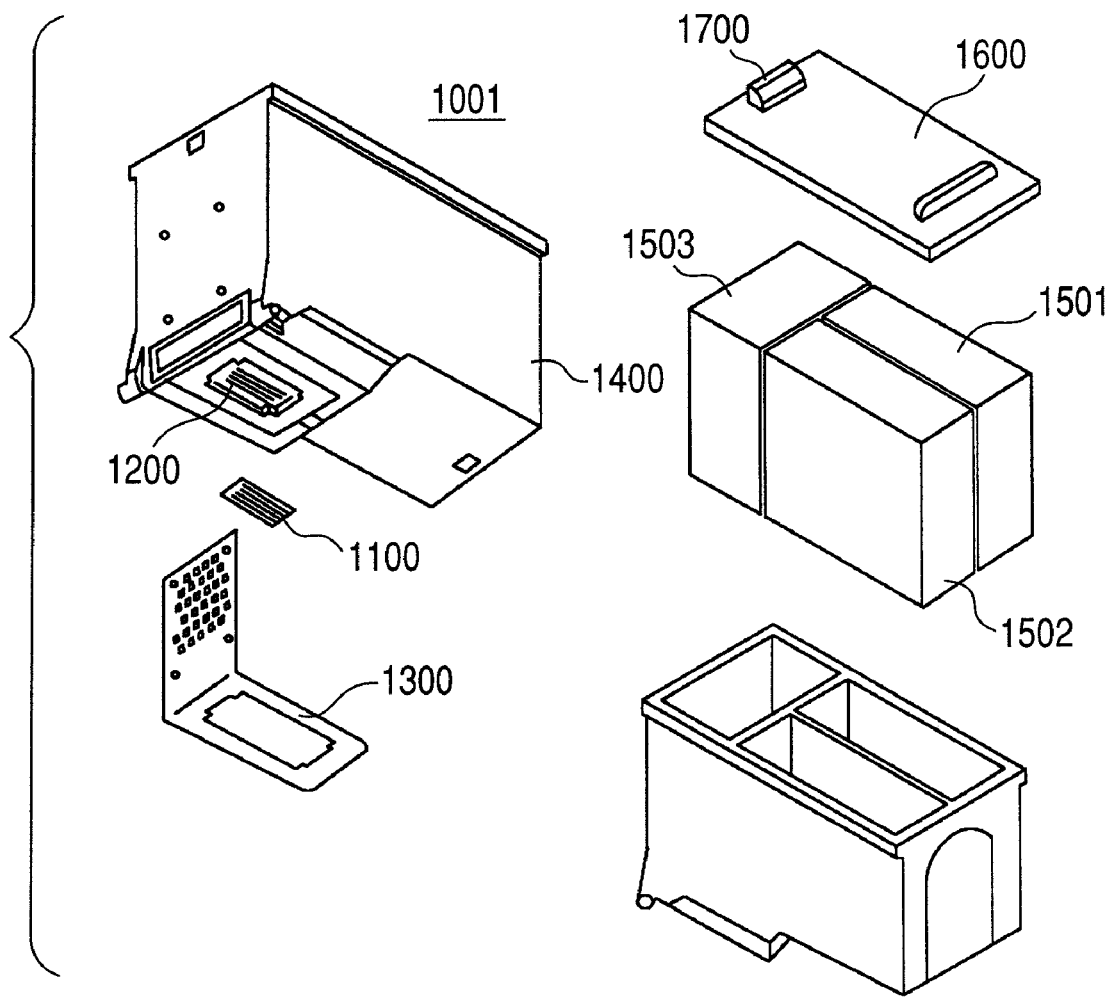
FIG. 4 is an exploded view of a recording head.

FIG. 4 is an exploded view of another example of a recording head which can be used in the present invention. As in the case of FIG. 3, the recording head illustrated in FIG. 4 is integrated with an ink cartridge. A recording head 1001 can be mounted with multiple inks different from each other in color (such as a cyan ink, a magenta ink, and a yellow ink), and is exchanged as any one of the inks held in the head is consumed.

The recording head 1001 is intended for the ejection of the multiple inks different from each other in color (such as a cyan ink, a magenta ink, and a yellow ink), and is formed of, for example, the recording element substrate 1100 in which ink supply orifices for cyan, magenta, and yellow inks are formed in parallel. Recording element trains (nozzle trains) corresponding to the multiple inks are formed in the recording element substrate 1100. In the present invention, from the viewpoint of an improvement in image quality of, for example, a photograph, each nozzle has a constitution in which a small ink droplet can be ejected having an ejection volume of 5 pL or less, especially 2 pL or less, and each ejection orifice preferably has a diameter of less than 10 μm. Further, from the viewpoint of the compatibility between high image quality and high-speed recording, it is also preferred that the nozzles be constituted so as to be capable of ejecting multiple inks having different ejection volumes (for example, 5 pL, 2 pL, and 1 pL). The ink-supplying/holding member 1400 is provided with a function as an ink cartridge and an ink-supplying function. That is, the member has spaces for independently holding absorbers 1501, 1502, and 1503 for generating negative pressures for holding the cyan, magenta, and yellow inks, thereby having a function as an ink cartridge. Further, an independent ink channel is formed to introduce each ink to each ink supply orifice of the recording element substrate 1100, whereby the member has the ink-supplying function.

<Recording Unit>

As a recording unit suitable for making a record by using the ink of the present invention, a recording unit provided with an ink storage portion for storing the ink and a recording head for ejecting the ink is exemplified. In particular, a recording unit can be preferably used in which the recording head ejects the ink by allowing thermal energy corresponding to the record signal to act on the ink inside the recording head having the ink storage portion storing the ink.

<Ink Jet Recording Apparatus>

As an ink jet recording apparatus suitable for making a record by using the ink of the present invention, an ink jet recording apparatus provided with an ink storage portion for storing the ink and a recording head for ejecting the ink is exemplified. In particular, an ink jet recording apparatus is cited in which the ink is ejected by allowing thermal energy corresponding to the record signal to act on the ink inside the recording head having the ink storage portion storing the ink.

Hereinafter, the schematic constitution of a mechanism portion of an ink jet recording apparatus is described. An ink jet recording apparatus includes a sheet feeding portion, a conveying portion, a carriage portion, a sheet delivery portion, a cleaning portion, and an external packaging portion for protecting them and providing them with design, to thereby achieve a role of each mechanism.

Figure 5:
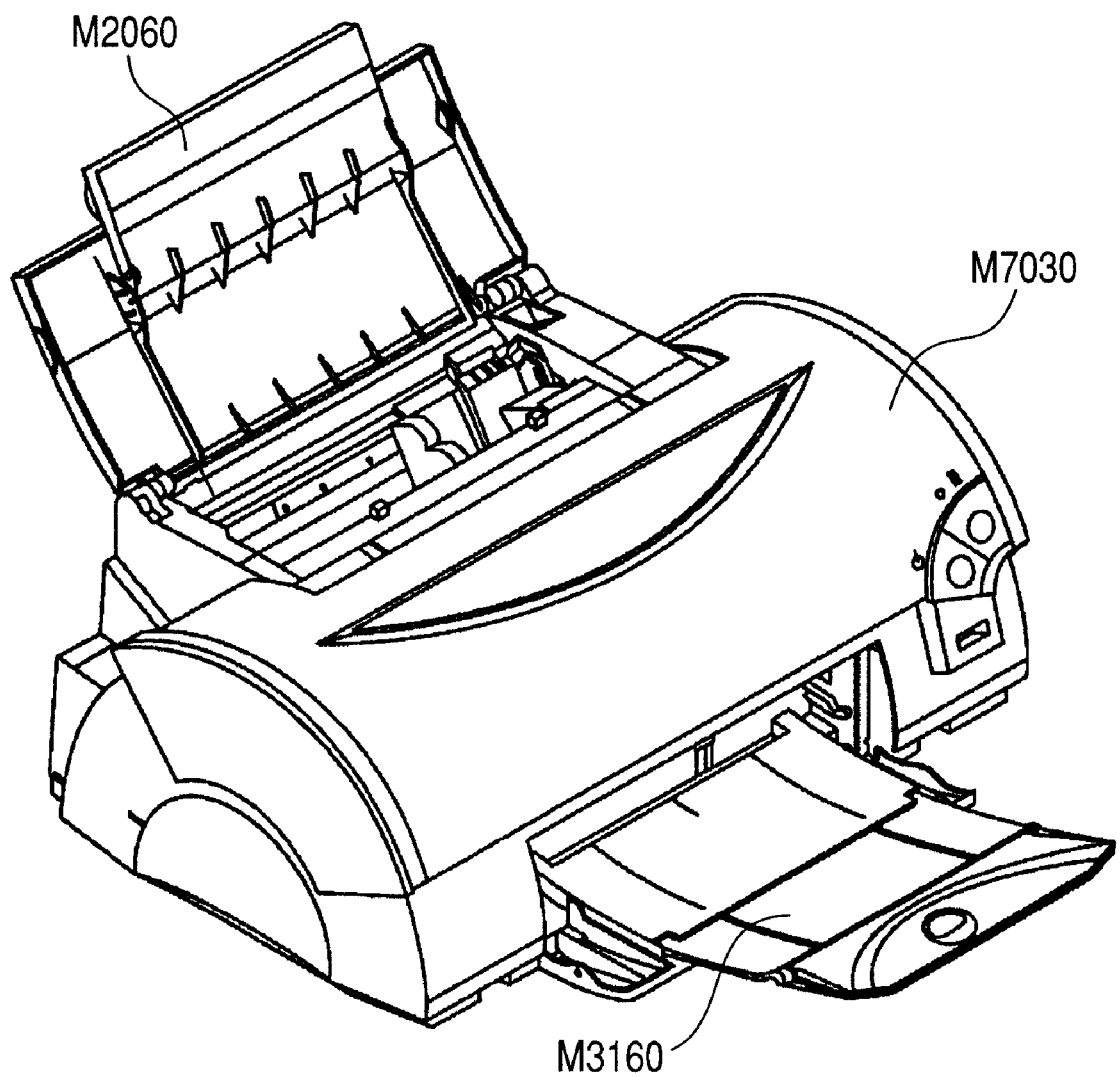
FIG. 5 is a perspective view of an ink jet recording apparatus.
Figure 6:
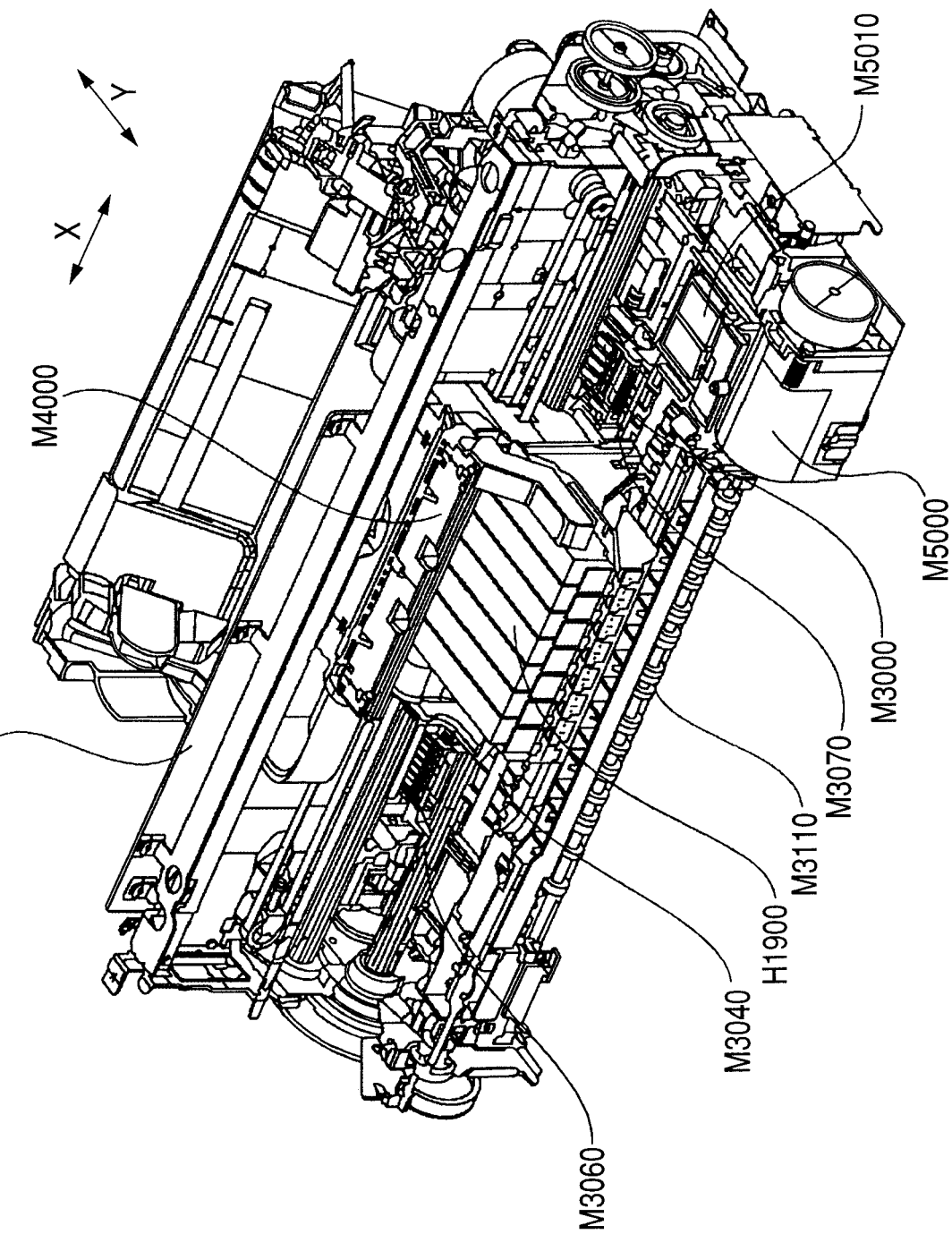
FIG. 6 is a perspective view of the mechanism portion of the ink jet recording apparatus.
Figure 7:
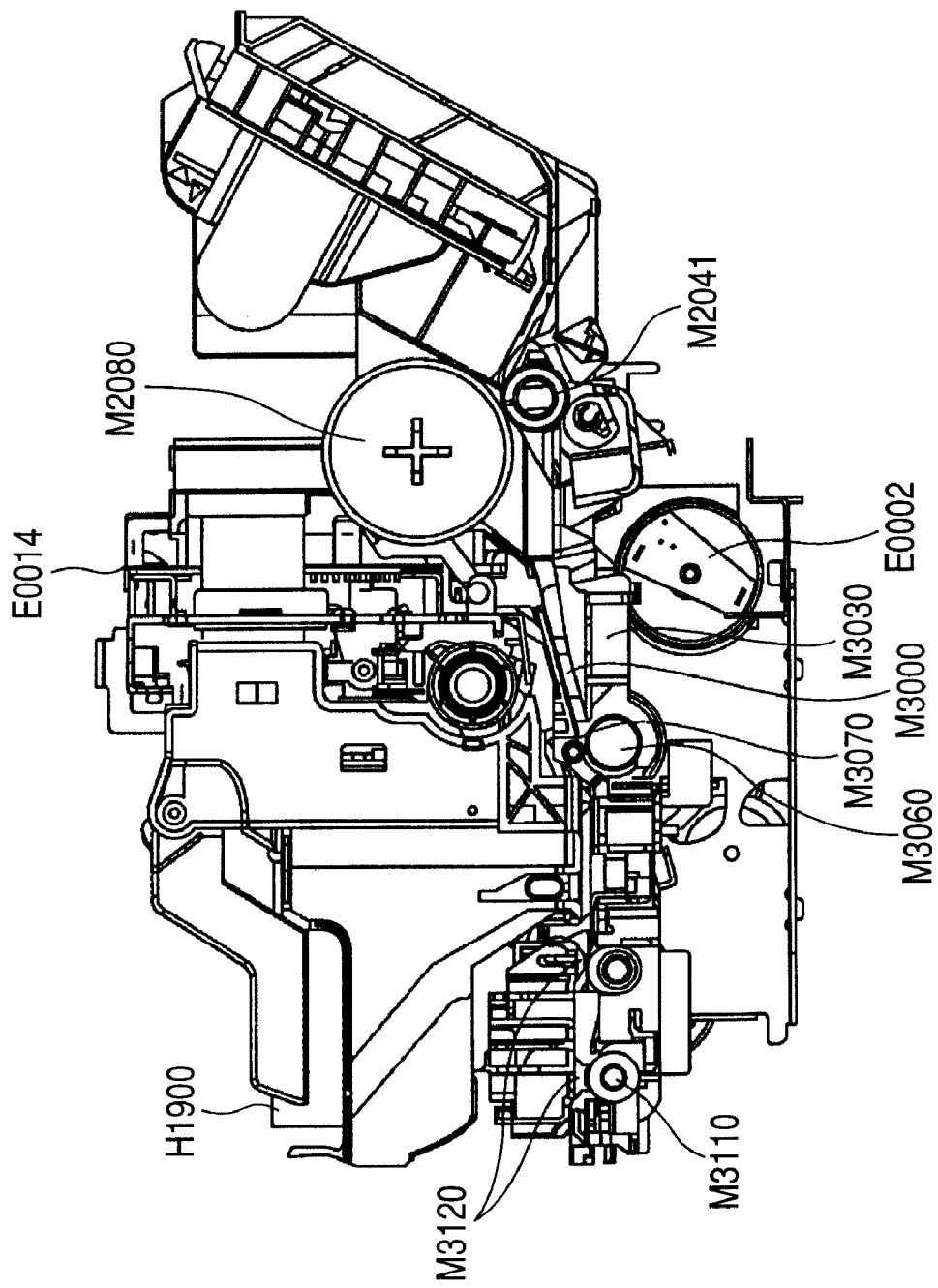
FIG. 7 is a sectional view of the ink jet recording apparatus.

FIG. 5 is a perspective view of an ink jet recording apparatus. FIGS. 6 and 7 are views for illustrating the internal mechanism of an ink jet recording apparatus. FIG. 6 is a perspective view seen from an upper right portion, and FIG. 7 is a side sectional view of the ink jet recording apparatus.

When sheets are fed in the recording apparatus, only a predetermined number of recording media are sent to a nip portion composed of a sheet feeding roller M2080 and a separating roller M2041 in the sheet feeding portion including a sheet feeding tray M2060. The recording media thus sent are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by an LF motor E0002, and the rotation conveys the recording medium on a platen M3040.

When an image is formed on a recording medium, a carriage portion places a recording head H1001 (FIG. 8: detailed constitution is described below) at a position where a target image is formed, and ink is ejected onto the recording medium in accordance with a signal from an electric substrate E0014. While recording is performed with the recording head H1001, an image is formed on the recording medium by alternately repeating main scanning in which a carriage M4000 scans the recording medium in a column direction and sub-scanning in which the transport roller M3060 transports the recording medium in a row direction. The recording medium is sandwiched at a nip between a first delivery roller M3110 and a spur M3120 in a delivery portion, and is transported and discharged to a delivery tray M3160.

A cleaning portion cleans the recording head H1001 before and after an image is formed. The cleaning portion sucks extra ink from the ejection orifice of the recording head H1001 by activating a pump M5000 in such a state that a cap M5010 is brought into close contact with the ejection orifice of the recording head H1001. In addition, when the cleaning portion sucks the ink remaining inside the cap M5010 in such a state that the cap M5010 is opened, the sticking of the remaining ink or any other detrimental effect is prevented from occurring.

(Constitution of Recording Head)

The constitution of a head cartridge H1000 will be described. The head cartridge H1000 includes the recording head H1001, means for mounting ink cartridge H1900, and means for supplying ink from the ink cartridge H1900 to the recording head. The head cartridge H1000 is detachably mounted on the carriage M4000.

Figure 8:
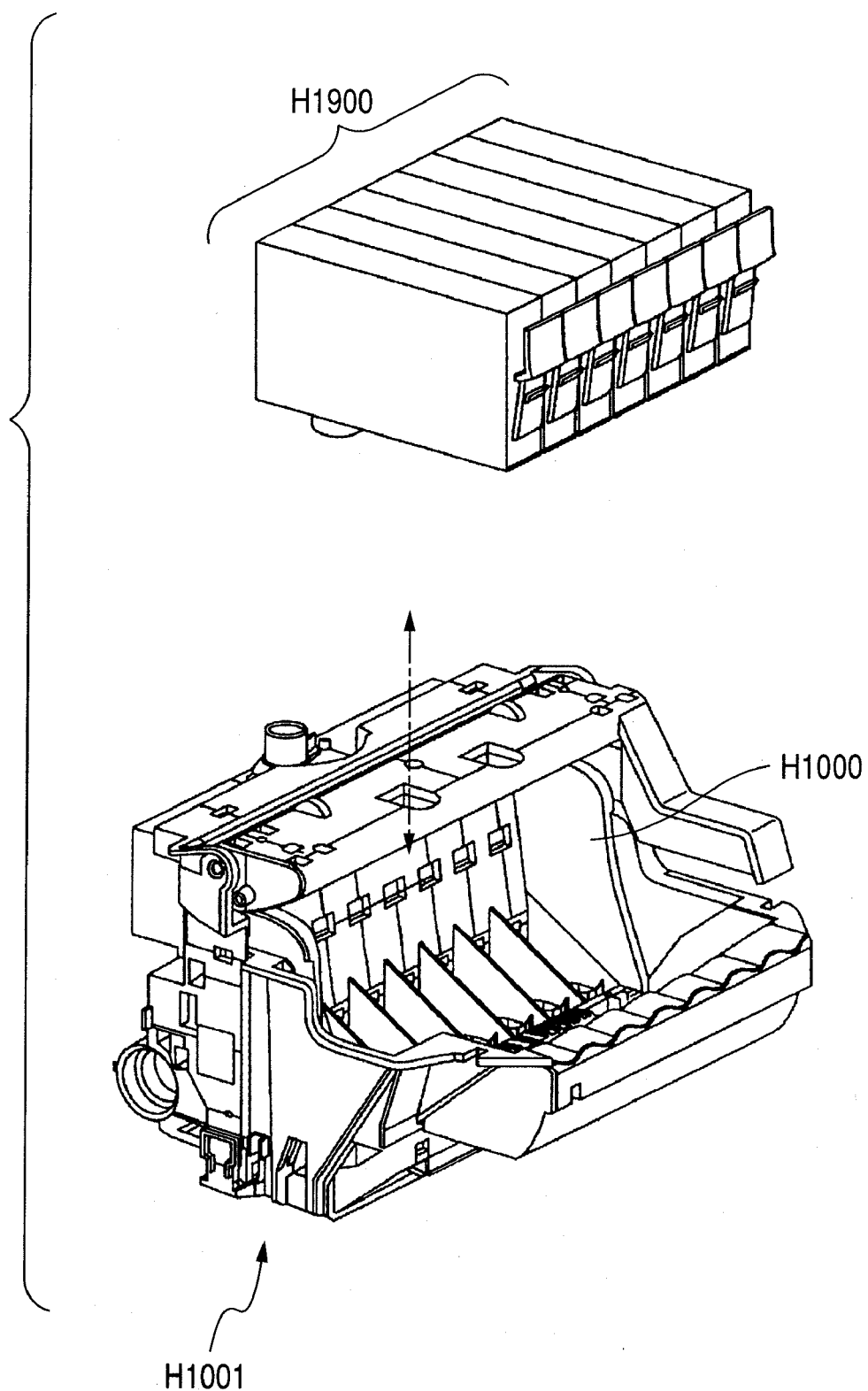
FIG. 8 is a perspective view illustrating a state in which an ink cartridge is mounted on a head cartridge.

FIG. 8 illustrates how the ink cartridges H1900 are mounted on the head cartridge H1000. The ink jet recording apparatus forms an image by means of, for example, each of yellow, magenta, cyan, black, light magenta, light cyan, and green inks, so the ink cartridge H1900 is independently prepared for each of the seven colors. The ink of the present invention is used as at least one of the above inks. In addition, as illustrated in FIG. 8, each ink cartridge H1900 is detachable from the head cartridge H1000. The ink cartridge H1900 can be detached in such a state that the head cartridge H1000 is mounted on the carriage M4000.

Figure 9:
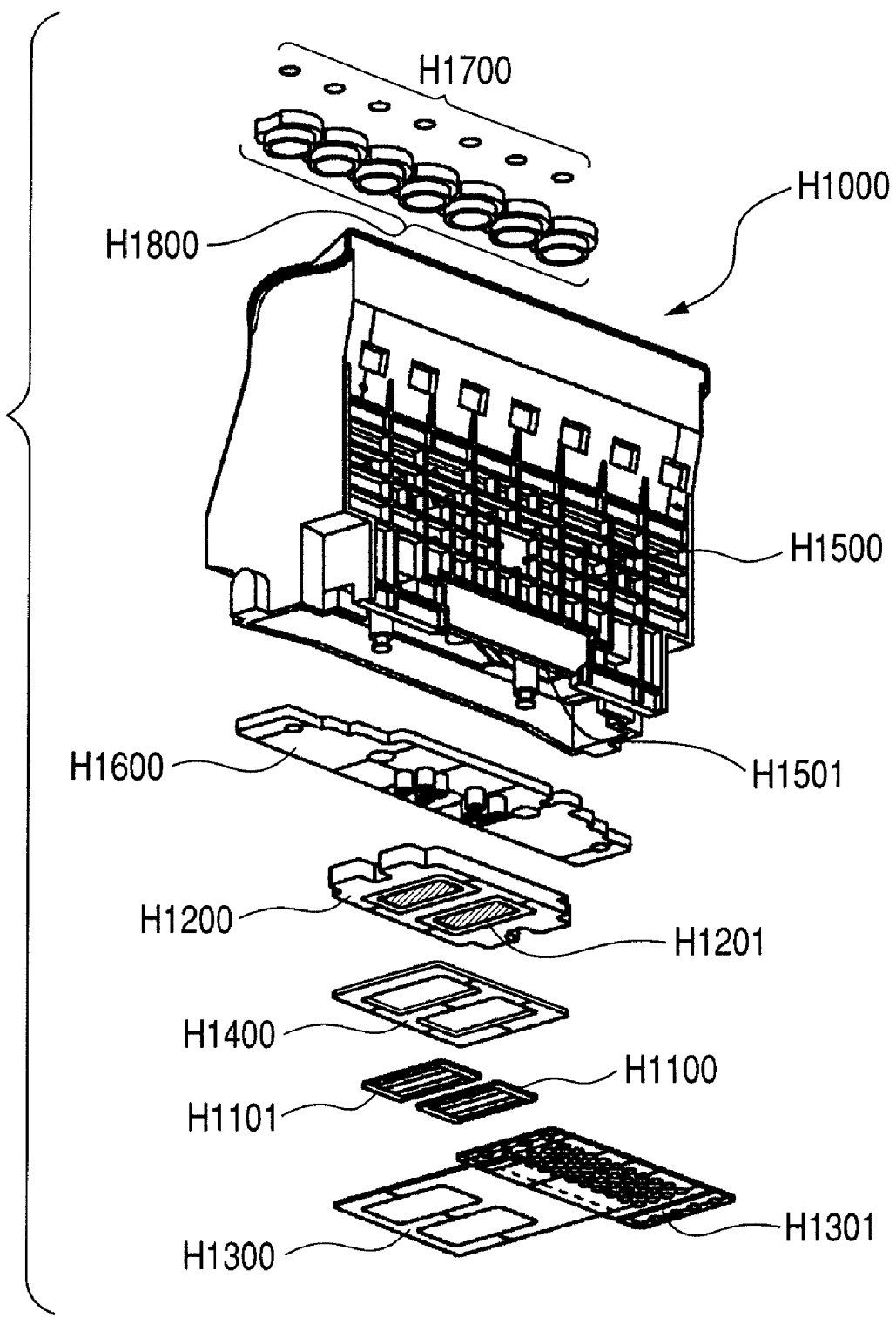
FIG. 9 is an exploded perspective view of the head cartridge.

FIG. 9 illustrates an exploded perspective view of the head cartridge H1000. The head cartridge H1000 includes a recording element substrate, a plate, an electric wiring substrate H1300, a cartridge holder H1500, a flow path forming member H1600, a filter H1700, and a seal rubber H1800. The recording element substrates are composed of a first recording element substrate H1100 and a second recording element substrate H1101, and the plates are composed of a first plate H1200 and a second plate H1400.

Each of the first recording element substrate H1100 and the second recording element substrate H1101 is an Si substrate having multiple recording elements (nozzles) for ejecting ink formed on one surface thereof by photolithography. Electric wiring formed of Al or the like for supplying power to each recording element is formed by a film formation technology or the like, and multiple ink flow paths corresponding to the individual recording elements are also formed by photolithography. Further, ink supply orifices for supplying ink to the multiple ink flow paths are formed so as to open on the rear surface.

Figure 10:
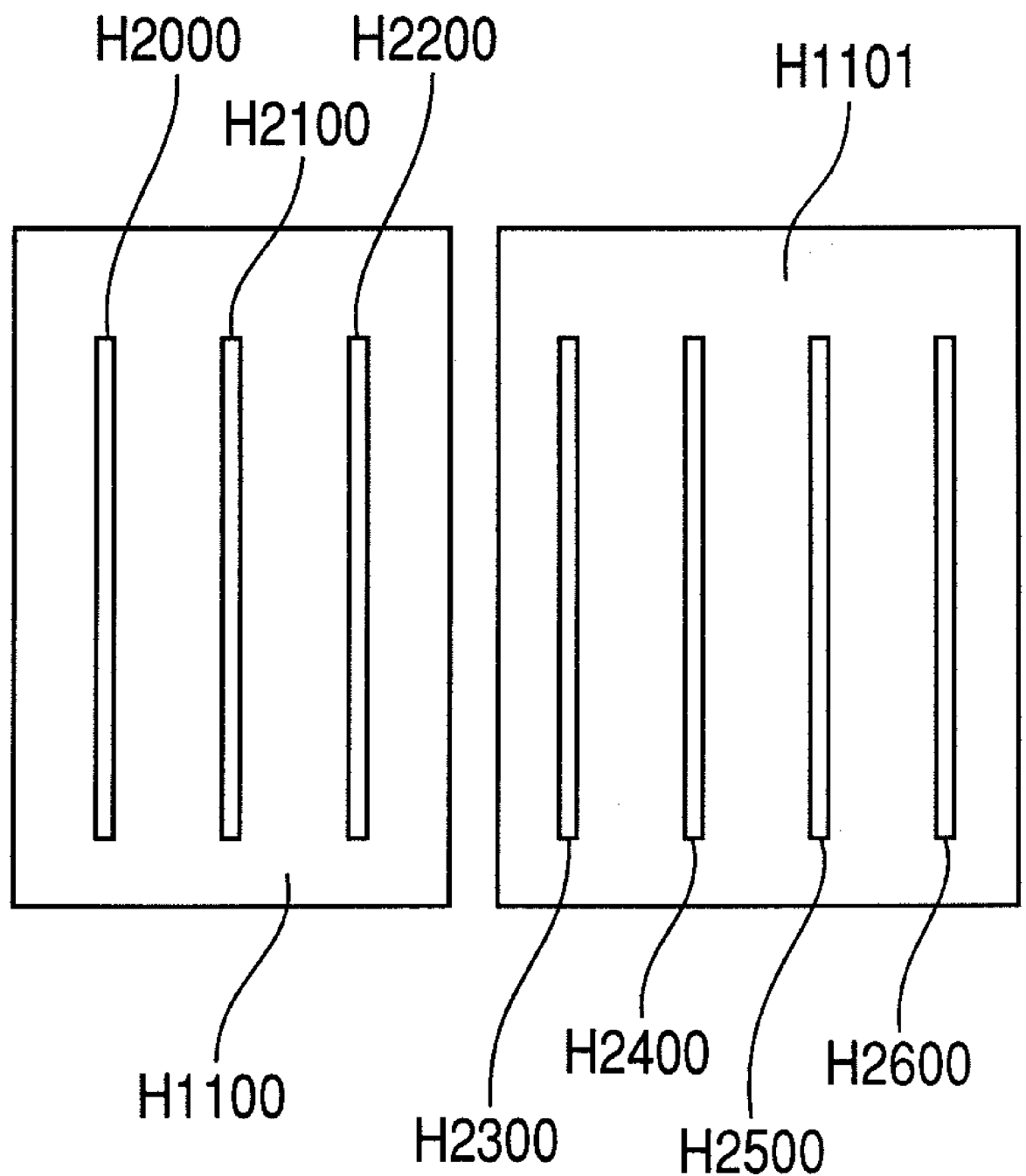
FIG. 10 is a front view illustrating recording element substrates in the head cartridge.

FIG. 10 is an enlarged front view for illustrating the constitution of each of the first recording element substrate H1100 and the second recording element substrate H1101. Reference symbols H2000 to H2600 denote recording element trains (hereinafter referred to also as nozzle trains) each supplying different ink colors. The first recording element substrate H1100 has nozzle trains for three colors: the nozzle train H2000 for yellow ink; the nozzle train H2100 for magenta ink; and the nozzle train H2200 for cyan ink. The second recording element substrate H1101 has nozzle trains for four colors: the nozzle train H2300 for light cyan ink; the nozzle train H2400 for black ink; the nozzle train H2500 for green ink; and the nozzle train H2600 for light magenta ink.

Each nozzle train includes 768 nozzles arranged at intervals of 1,200 dpi (dot/inch; reference value) in the direction in which a recording medium is conveyed (sub scanning direction), and each nozzle ejects about 2 pL of ink at a time. An opening area in each ejection orifice is set to be about 100 $\mu m^2$. The diameter of the aperture is set to be about 6 $\mu m$.

Hereinafter, description will be made with reference to FIGS. 8 and 9. The first recording element substrate H1100 and the second recording element substrate H1101 are bonded and fixed to the first plate H1200, and ink supply orifices H1201 for supplying ink to the first recording element substrate H1100 and the second recording element substrate H1101 are formed on the first plate H1200. The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 applies an electrical signal for causing ink to be ejected from each of the nozzles formed on the first recording element substrate H1100 and the second recording element substrate H1101. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the ink jet recording apparatus. The external signal input terminal H1301 is positioned and fixed to the back surface side of the cartridge holder H1500.

The flow path forming member H1600 is fixed by means of, for example, ultrasonic welding to the cartridge holder H1500 for holding the ink cartridge H1900. Thus, an ink flow path H1501 passing from the ink cartridge H1900 to the first plate H1200 is formed. The filter H1700 is arranged at an end portion on the ink cartridge side of the ink flow path H1501 engaged with the ink cartridge H1900, so the filter H1700 prevents dust from entering from the outside. The seal rubber H1800 is mounted on the portion at which the ink flow path H1501 is engaged with the ink cartridge H1900 to prevent ink from evaporating from the portion.

Further, as described above, the head cartridge H1000 is formed by, for example, causing a cartridge holder portion and the recording head H1001 to adhere to each other. The cartridge holder portion is composed of the cartridge holder H1500, the flow path forming member H1600, the filter H1700, and the sealing rubber H1800. In addition, the recording head H1001 is composed of the first recording element substrate H1100 and the second recording element substrate H1101, the first plate H1200, the electric wiring substrate H1300, and the second plate H1400.

Description has been made by taking, as an example of an embodiment of a recording head, a recording head according to a thermal ink jet system in which recording performed by means of an electrothermal transducer (recording element) for generating thermal energy for causing ink to generate film boiling in accordance with an electrical signal. As for the representative constitution and principle of an ink jet system are based on the basic principles disclosed in, for example, U.S. Pat. No. 4,723,129 and U.S. Pat. No. 4,740,796. The system is applicable to any one of the so-called on-demand type and continuous type.

The thermal ink jet system is particularly useful for the on-demand type. In the case of the on-demand type, at least one driving signal which corresponds to recording information and causes an abrupt temperature rise exceeding nuclear boiling is applied to an electrothermal transducer arranged correspondingly to a liquid path holding ink, to thereby cause the electrothermal transducer to generate thermal energy. Then, a thermal action surface of a recording head is caused to bring about film boiling. As a result, an air bubble in the ink can be formed so as to be in one-to-one correspondence with the driving signal. The growth and contraction of the air bubble cause the ink to be ejected through an opening for injection, thereby forming at least one liquid droplet. The driving signal is more preferably pulsed because the growth and contraction of an air bubble can be performed immediately and appropriately, and hence ink can be ejected with excellent responsiveness.

In addition, the ink of the present invention can be preferably used in not only a recording head according to the thermal ink jet system but also such an ink jet recording apparatus utilizing mechanical energy as described below. The ink jet recording apparatus utilizing mechanical energy includes: a nozzle-forming substrate having multiple nozzles; a pressure-generating element placed opposite to the nozzles and formed of a piezoelectric material and a conductive material;

and ink with which the periphery of the pressure-generating element is filled. In addition, the pressure-generating element is displaced by an applied voltage, and the ink is ejected from the nozzles.

The ink jet recording apparatus is not limited to such apparatus as described above in which a recording head and an ink cartridge are separated, and may be one in which a head and an ink cartridge are integrated so that they are inseparable. Further, the ink cartridge may be separably or inseparably integrated with the recording head to be mounted on a carriage, or may be mounted at a fixing portion of an ink jet recording apparatus to supply ink to a recording head through an ink supply member such as a tube. When the ink cartridge is provided with a constitution for applying a preferable negative pressure to the recording head, it may be configured as follows. That is, an absorber may be arranged in an ink containing portion of the ink cartridge, or the ink cartridge may have a flexible ink storage bag and a spring portion for applying force biased in the direction of expanding the internal volume of the bag. Further, the ink jet recording apparatus may adopt a serial type recording system, or may be in the form of a line printer obtained by aligning recording elements over the range corresponding to the entire width of a recording medium.

EXAMPLES

Hereinafter, the present invention is described in more detail by way of examples and comparative examples. However, the present invention is not limited to the following examples as long as not departing from the gist of the present invention. Unless otherwise specified, the term "%" is by mass.

<Preparation of Ink>

The respective components shown in the upper column of each of Tables 1 to 3 below were mixed and sufficiently stirred and dissolved. After that, the resultant was filtrated through a microfilter having a pore size of 0.2 µm (manufactured by FUJIFILM Corporation) under pressure, whereby an ink of each of Examples 1 to 17 and Comparative Examples 1 to 8 was prepared. The lower column of each of Tables 1 to 3 below show the above-mentioned contents A to C and the ratio thereof which characterize the inks of Examples 1 to 17 and Comparative Examples 1 to 8.

TABLE 1

Ink composition (unit of each component shown in upper column: %)

| | | Example | | | | | | | | |
|---|---|---|---|---|---|---|---|---|---|---|
| | | 1 | 2 | 3 | 4 | 5 | 6 | 7 | 8 | 9 |
| C.I. Acid red 289 | | 6.0 | | | 6.0 | 6.0 | 6.0 | 6.0 | 6.0 | 6.0 |
| C.I. Direct blue 199 | | | 6.0 | | | | | | | |
| C.I. Direct yellow 132 | | | | 6.0 | | | | | | |
| Alkanediol (*1) | 2-methyl-1,3-propanediol | | | | | | | | | |
| | 2-ethyl-1,3-propanediol | | | | | | | | | |
| | 3-methyl-1,5-pentanediol | 11.0 | 11.0 | 11.0 | 11.0 | 11.0 | 11.0 | 11.0 | 11.0 | 11.0 |
| | 2,4-diethyl-1,5-pentanediol | | | | | | | | | |
| | 2,4,6-trimethyl-1,7-heptanediol | | | | | | | | | |
| Glycerin | | 6.0 | 6.0 | 6.0 | 6.0 | 6.0 | 6.0 | 6.0 | 6.0 | 12.0 |
| Ethylene glycol | | | | | | | | 10.0 | | |
| Diethylene glycol | | | | | | 10.0 | | | | |
| Polyethylene glycol (*2) | | | | | | | | 10.0 | | |
| 2-pyrrolidone | | 10.0 | 10.0 | 10.0 | | | | | 5.0 | 4.0 |
| Urea | | | | | | 10.0 | | | | |
| Acetylenol EH (*3) | | 0.6 | 0.6 | 0.6 | 0.6 | 0.6 | 0.6 | 0.6 | 0.6 | 0.6 |
| Water | | 66.4 | 66.4 | 66.4 | 66.4 | 66.4 | 66.4 | 66.4 | 71.4 | 66.4 |
| Content of coloring material (mass %) | | 6.0 | 6.0 | 6.0 | 6.0 | 6.0 | 6.0 | 6.0 | 6.0 | 6.0 |
| Content A of alkanediol (*1) (mass %) | | 11.0 | 11.0 | 11.0 | 11.0 | 11.0 | 11.0 | 11.0 | 11.0 | 11.0 |
| Total content B of water-soluble organic solvents (mass %) | | 27.0 | 27.0 | 27.0 | 27.0 | 27.0 | 27.0 | 27.0 | 22.0 | 27.0 |
| Content C of glycerin (mass %) | | 6.0 | 6.0 | 6.0 | 6.0 | 6.0 | 6.0 | 6.0 | 6.0 | 12.0 |
| A/B | | 0.41 | 0.41 | 0.41 | 0.41 | 0.41 | 0.41 | 0.41 | 0.50 | 0.41 |
| A/C | | 1.83 | 1.83 | 1.83 | 1.83 | 1.83 | 1.83 | 1.83 | 1.83 | 0.92 |

(*1) A branched alkanediol having hydroxyl groups at both terminals of its main chain
(*2) A weight average molecular weight of 200
(*3) An acetylene glycol ethylene oxide adduct (surfactant; manufactured by Kawaken Fine Chemicals Co., Ltd.)

TABLE 2

Ink composition (unit of each component shown in upper column: %)

| | Example | | | | | | | |
|---|---|---|---|---|---|---|---|---|
| | 10 | 11 | 12 | 13 | 14 | 15 | 16 | 17 |
| C.I. Acid red 289 | 6.0 | 6.0 | 6.0 | 6.0 | 6.0 | 6.0 | 6.0 | 6.0 |
| C.I. Direct blue 199 | | | | | | | | |
| C.I. Direct yellow 132 | | | | | | | | |

TABLE 2-continued

Ink composition (unit of each component shown in upper column: %)

| | | Example 10 | Example 11 | Example 12 | Example 13 | Example 14 | Example 15 | Example 16 | Example 17 |
|---|---|---|---|---|---|---|---|---|---|
| Alkanediol (*1) | 2-methyl-1,3-propanediol | | | | | | | | 11.0 |
| | 2-ethyl-1,3-propanediol | | | | | | 11.0 | | |
| | 3-methyl-1,5-pentanediol | 5.0 | 11.0 | 4.0 | 11.0 | | | | |
| | 2,4-diethyl-1,5-pentanediol | | | | | | | 5.0 | |
| | 2,4,6-trimethyl-1,7-heptanediol | | | | | 5.0 | | | |
| Glycerin | | 6.0 | 6.0 | 6.0 | 6.0 | 6.0 | 6.0 | 6.0 | 6.0 |
| Ethylene glycol | | | | | | | | | |
| Diethylene glycol | | | | | | | | | |
| Polyethylene glycol (*2) | | | | | | | | | |
| 2-pyrrolidone | | 3.0 | 18.0 | 3.3 | 19.0 | 3.0 | 10.0 | 3.0 | 10.0 |
| Urea | | | | | | | | | |
| Acetylenol EH (*3) | | 0.6 | 0.6 | 0.6 | 0.6 | 0.6 | 0.6 | 0.6 | 0.6 |
| Water | | 79.4 | 58.4 | 80.1 | 57.4 | 79.4 | 66.4 | 79.4 | 66.4 |
| Content of coloring material (mass %) | | 6.0 | 6.0 | 6.0 | 6.0 | 6.0 | 6.0 | 6.0 | 6.0 |
| Content A of alkanediol (*1) (mass %) | | 5.0 | 11.0 | 4.0 | 11.0 | 5.0 | 11.0 | 5.0 | 11.0 |
| Total content B of water-soluble organic solvents (mass %) | | 14.0 | 35.0 | 13.3 | 36.0 | 14.0 | 27.0 | 14.0 | 27.0 |
| Content C of glycerin (mass %) | | 6.0 | 6.0 | 6.0 | 6.0 | 6.0 | 6.0 | 6.0 | 6.0 |
| A/B | | 0.36 | 0.31 | 0.30 | 0.31 | 0.36 | 0.41 | 0.36 | 0.41 |
| A/C | | 0.83 | 1.83 | 0.67 | 1.83 | 0.83 | 1.83 | 0.83 | 1.83 |

(*1) A branched alkanediol having hydroxyl groups at both terminals of its main chain
(*2) A weight average molecular weight of 200
(*3) An acetylene glycol ethylene oxide adduct (surfactant; manufactured by Kawaken Fine Chemicals Co., Ltd.)

TABLE 3

Ink composition (unit of each component shown in upper column: %)

| | | Comparative Example 1 | 2 | 3 | 4 | 5 | 6 | 7 | 8 |
|---|---|---|---|---|---|---|---|---|---|
| C.I. Acid red 289 | | 6.0 | 6.0 | 6.0 | 7.0 | 6.0 | 6.0 | 6.0 | 6.0 |
| C.I. Direct blue 199 | | | | | | | | | |
| C.I. Direct yellow 132 | | | | | | | | | |
| Alkanediol (*1) | 2-methyl-1,3-propanediol | 3.0 | 12.0 | 11.0 | 11.0 | 4.0 | 11.0 | 11.0 | 11.0 |
| | 2-ethyl-1,3-propanediol | | | | | | | | |
| | 3-methyl-1,5-pentanediol | | | | | | | | |
| | 2,4-diethyl-1,5-pentanediol | | | | | | | | |
| | 2,4,6-trimethyl-1,7-heptanediol | | | | | | | | |
| Glycerin | | 6.0 | 6.0 | 5.0 | 6.0 | 6.0 | 6.0 | 13.0 | |
| Ethylene glycol | | | | | | | | | |
| Diethylene glycol | | | | | | | | | |
| Polyethylene glycol (*2) | | | | | | | | | |
| 2-pyrrolidone | | 1.0 | 10.0 | 11.0 | 10.0 | 10.0 | 2.0 | 3.0 | 16.0 |
| Urea | | | | | | | | | |
| Acetylenol EH (*3) | | 0.6 | 0.6 | 0.6 | 0.6 | 0.6 | 0.6 | 0.6 | 0.6 |
| Water | | 83.4 | 65.4 | 66.4 | 65.4 | 73.4 | 74.4 | 66.4 | 66.4 |
| Content of coloring material (mass %) | | 6.0 | 6.0 | 6.0 | 7.0 | 6.0 | 6.0 | 6.0 | 6.0 |
| Content A of alkanediol (*1) (mass %) | | 3.0 | 12.0 | 11.0 | 11.0 | 4.0 | 11.0 | 11.0 | 11.0 |
| Total content B of water-soluble organic solvents (mass %) | | 10.0 | 28.0 | 27.0 | 27.0 | 20.0 | 19.0 | 27.0 | 27.0 |
| Content C of glycerin (mass %) | | 6.0 | 6.0 | 5.0 | 6.0 | 6.0 | 6.0 | 13.0 | 0.0 |
| A/B | | 0.30 | 0.43 | 0.41 | 0.41 | 0.20 | 0.58 | 0.41 | 0.41 |
| A/C | | 0.50 | 2.00 | 2.20 | 1.83 | 0.67 | 1.83 | 0.85 | — |

(*1) A branched alkanediol having hydroxyl groups at both terminals of its main chain
(*2) A weight average molecular weight of 200
(*3) An acetylene glycol ethylene oxide adduct (surfactant; manufactured by Kawaken Fine Chemicals Co., Ltd.)

<Evaluation of Ink>

(Intermittent Ejection Stability: Under Low-Temperature, Low-Humidity Environment)

Each of the inks obtained in the foregoing was charged into an ink cartridge for a PIXUS9900i (manufactured by Canon Inc.), and each of the resultant ink cartridges was mounted on a modified apparatus of an ink jet recording apparatus (PIXUS9900i; manufactured by Canon Inc.). Next, the ink jet recording apparatus with the ink cartridge mounted thereon was left standing without performing ejection under an environment having a temperature of 15° C. and a relative humidity of 10% (low-temperature, low-humidity) for more than five hours and then some ink droplets were ejected under the same environment as above. The ejection of the ink is suspended for five seconds, after that the ink was ejected to record vertical ruled lines on a recording medium (trade name: HR-101; manufactured by Canon Inc.) without performing, for example, a recovery action for the recording head. The ejection volume of a recording head used in this case was about 2 pL. Evaluation was made for the intermittent ejection stability (under a low-temperature, low-humidity environment) by visually observing the resultant recorded article. Evaluation criteria for the intermittent ejection stability (under a low-temperature, low-humidity environment) are as described below. Table 4 shows the results of the evaluation. In the present invention, A and B are assumed as levels having enough properties, A is the superior level and C is the level that cannot be permitted in the following evaluation criteria.

A: No disruption that can be visually observed is present.
B: Slight disruption that can be visually observed is present.
C: Portions in which the ink is not ejected or disturbance is clearly observed in the vertical ruled lines, and recording cannot be normally performed.

(Intermittent Ejection Stability: Under High-Temperature, Low-Humidity Environment)

Each of the inks obtained in the foregoing was charged into an ink cartridge for a PIXUS9900i (manufactured by Canon Inc.), and the resultant ink cartridge was mounted on a modified apparatus of an ink jet recording apparatus (PIXUS9900i; manufactured by Canon Inc.). Next, the ink jet recording apparatus with the ink cartridge mounted thereon was left standing without performing ejection under an environment having a temperature of 30° C. and a relative humidity of 10% (high-temperature, low-humidity) for more than five hours and then some ink droplets were ejected under the same environment as above. The ejection of the ink is suspended for five seconds, after that the ink was ejected to record vertical ruled lines on a recording medium (trade name: HR-101; manufactured by Canon Inc.) without performing, for example, a recovery action for the recording head. The ejection volume of a recording head used in this case was about 2 pL. Evaluation was made for the intermittent ejection stability (under a high-temperature, low-humidity environment) by visually observing the resultant recorded article. Evaluation criteria for the intermittent ejection stability (under a high-temperature, low-humidity environment) are as described below. Table 4 shows the results of the evaluation. In the present invention, A and B are assumed as levels having enough properties, A is the superior level and C is the level that cannot be permitted in the following evaluation criteria.

A: Disruption that cannot be visually observed, but can be observed with a loupe at a magnification of 10 is present.
B: Slight disruption that can be visually observed is present.
C: Portions on which the ink is not ejected or disruption is clearly observed in the vertical ruled lines, and recording cannot be normally performed.

(Stability of Ink)

The respective inks obtained in the foregoing were charged in amounts of 7 g each into dishes prepared separately, and were left standing under an environment having a temperature of 30° C. and a relative humidity of 10% until none of the inks showed a mass change. After that, each of the inks was evaluated for its stability by visually observing the state of the ink in the dish. Evaluation criteria for the ink stability are as described below. Table 4 shows the results of the evaluation. In the present invention, A and B are assumed as levels having enough properties, A is the superior level and C is the level that cannot be permitted in the following evaluation criteria.

A: The ink has flowability.
B: Precipitate is slightly present, but the ink has flowability.
C: The ink has no flowability.

TABLE 4

| | Results of evaluation | | |
|---|---|---|---|
| | Intermittent ejection stability | | |
| | Low-temperature, low-humidity (15° C./10% RH) | High-temperature, low-humidity (30° C./10% RH) | Stability of ink |
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | A |
| Example 8 | A | A | A |
| Example 9 | A | A | A |
| Example 10 | A | A | A |
| Example 11 | A | A | A |
| Example 12 | B | A | B |
| Example 13 | B | A | B |
| Example 14 | B | B | B |
| Example 15 | B | A | A |
| Example 16 | B | A | A |
| Example 17 | B | B | B |
| Comparative Example 1 | C | C | B |
| Comparative Example 2 | B | B | C |
| Comparative Example 3 | C | C | B |
| Comparative Example 4 | C | C | B |
| Comparative Example 5 | C | C | B |
| Comparative Example 6 | C | B | C |
| Comparative Example 7 | C | B | B |
| Comparative Example 8 | B | B | C |

While the present invention has been described with reference to exemplary embodiments, it is to be understood that the invention is riot limited to the disclosed exemplary embodiments. The scope of the following claims is to be accorded the broadest interpretation so as to encompass all such modifications and equivalent structures and functions.

This application claims the benefit of Japanese Patent Application No. 2008-072275, filed Mar. 19, 2008, which is hereby incorporated by reference herein in its entirety.

What is claimed is:
1. An ink jet ink comprising:
a coloring material; and
water-soluble organic solvents,
wherein a content of the coloring material is less than 7.0 mass % based on a total mass of the ink,
wherein the water-soluble organic solvents comprise (i) glycerin and (ii) a branched alkanediol having hydroxyl groups at both terminals of its main chain,
wherein a content C of glycerin is 6.0 mass % or more and 12.0 mass % or less based on the total mass of the ink,
wherein a content A of the branched alkanediol having hydroxyl groups at both terminals of its main chain is 4.0 mass % or more and 11.0 mass % or less based on the total mass of the ink, and wherein the content A of the branched alkanediol having hydroxyl groups at both terminals of its main chain and a total content B of the water-soluble organic solvents based on the total mass of the ink satisfy a relationship of $0.30 \leq A/B \leq 0.50$.

2. An ink jet ink according to claim 1, wherein the total content B of the water-soluble organic solvents is 14.0 mass % or more and 35.0 mass % or less based on the total mass of the ink.

3. An ink jet ink according to claim 1, wherein the branched alkanediol having hydroxyl groups at both terminals of its main chain has 5 or more and 9 or less carbon atoms in total.

4. An ink jet ink according to claim 1, wherein the branched alkanediol having hydroxyl groups at both terminals of its main chain is 3-methyl-1,5-pentanediol.

5. An ink jet recording method comprising ejecting ink according to an ink jet method to perform recording on a recording medium, wherein the ink comprises the ink jet ink according to claim 1.

6. An ink cartridge comprising an ink storage portion for storing ink, wherein the ink comprises the ink jet ink according to claim 1.

7. A recording unit comprising:
an ink storage portion for storing ink; and
a recording head for ejecting the ink,
wherein the ink comprises the ink jet ink according to claim 1.

8. An ink jet recording apparatus comprising:
an ink storage portion for storing ink; and
a recording head for ejecting the ink,
wherein the ink comprises the ink jet ink according to claim 1.

9. An ink jet ink according to claim 1, wherein the coloring material is a pigment.

10. An ink jet ink according to claim 1, wherein the coloring material is a dye.

* * * * *